(12) United States Patent
Hendrix et al.

(10) Patent No.: US 11,971,600 B2
(45) Date of Patent: Apr. 30, 2024

(54) FIBER ORGANIZER

(71) Applicant: viaPhoton, Inc., Aurora, IL (US)

(72) Inventors: Walter Mark Hendrix, Richardson, TX (US); Morgan Dunn, Dallas, TX (US)

(73) Assignee: viaPhoton, Inc., Aurora, IL (US)

( * ) Notice: Subject to any disclaimer, the term of this patent is extended or adjusted under 35 U.S.C. 154(b) by 0 days.

(21) Appl. No.: 17/502,883

(22) Filed: Oct. 15, 2021

(65) Prior Publication Data

US 2022/0035114 A1 Feb. 3, 2022

Related U.S. Application Data

(63) Continuation-in-part of application No. 17/345,897, filed on Jun. 11, 2021.

(60) Provisional application No. 63/092,067, filed on Oct. 15, 2020, provisional application No. 63/038,405, filed on Jun. 12, 2020.

(51) Int. Cl.
*G02B 6/44* (2006.01)
(52) U.S. Cl.
CPC .................. *G02B 6/4479* (2013.01)
(58) Field of Classification Search
CPC ............... G02B 6/4479; G02B 6/448
See application file for complete search history.

(56) References Cited

U.S. PATENT DOCUMENTS

| | | | |
|---|---|---|---|
| 6,758,600 B2 | 7/2004 | Del Grosso et al. | |
| 6,869,227 B2 | 3/2005 | Del Grosso et al. | |
| 8,184,938 B2 | 5/2012 | Cooke et al. | |
| 8,452,148 B2 | 5/2013 | Cooke et al. | |
| 8,538,226 B2 | 9/2013 | Makrides-Saravanos et al. | |
| 8,712,206 B2 | 4/2014 | Cooke et al. | |
| 9,020,320 B2 | 4/2015 | Cooke et al. | |
| 10,094,996 B2 | 10/2018 | Cooke et al. | |
| 10,120,153 B2 | 11/2018 | Cooke et al. | |
| 10,281,672 B1 | 5/2019 | Mullsteff | |
| 10,401,258 B2 * | 9/2019 | Brace | G01M 11/30 |
| 10,444,456 B2 | 10/2019 | Cooke et al. | |
| 10,551,585 B2 | 2/2020 | Mullsteff | |
| 2019/0003923 A1 * | 1/2019 | Brace | G01M 11/30 |
| 2019/0025515 A1 * | 1/2019 | Van Wuyckhuyse | G02B 6/245 |
| 2020/0064549 A1 * | 2/2020 | Nishina | G02B 6/2553 |
| 2022/0254005 A1 * | 8/2022 | Wilkinson | G06N 3/0454 |

* cited by examiner

*Primary Examiner* — Eric Wong
(74) *Attorney, Agent, or Firm* — Ferguson Braswell Fraser Kubasta PC

(57) ABSTRACT

A method organizes fibers. A plurality of fibers is received into a first assembly. An initial sequence of the plurality of fibers in the first assembly is obtained. A set of key combinations is identified from the initial sequence and a predetermined sequence. A second assembly is slid across the first assembly. The set of key combinations is actuated to move the plurality of fibers from the first assembly to the second assembly and order the plurality of fibers in the second assembly in the predetermined sequence.

20 Claims, 26 Drawing Sheets

FIBER ORGANIZER

CROSS REFERENCE TO RELATED APPLICATIONS

This application is a continuation in part of U.S. application Ser. No. 17/345,897 filed Jun. 11, 2021, which claims the benefit of U.S. Provisional Application 63/038,405, filed Jun. 12, 2020, and U.S. Provisional Application 63/092,067, filed Oct. 15, 2020. Each of the applications identified above are incorporated by reference herein.

BACKGROUND

Before optical fibers are inserted into a connector, the optical fibers are organized so that the sequence of fibers within the connector are ordered in accordance with a predetermined sequence. Using the predetermined sequence ensures that an optical signal is transmitted through the proper optical fiber. A challenge is to automatically organize randomly sequenced fibers into a predetermined sequence.

SUMMARY

In general, in one or more aspects, the disclosure relates to a method that organizes fibers. A plurality of fibers is received into a first assembly. An initial sequence of the plurality of fibers in the first assembly is obtained. A set of key combinations is identified from the initial sequence and a predetermined sequence. A second assembly is slid across the first assembly. The set of key combinations is actuated to move the plurality of fibers from the first assembly to the second assembly and order the plurality of fibers in the second assembly in the predetermined sequence.

In general, in one or more aspects, the disclosure relates to a fiber sorting system that includes a first assembly, a second assembly, a computing system, and a control application. The control application executes on the computing system and configures the fiber sorting system to obtain an initial sequence of a plurality of fibers in the first assembly. A set of key combinations is identified from the initial sequence and a predetermined sequence. The second assembly is slid across the first assembly. The set of key combinations is actuated to move the plurality of fibers from the first assembly to the second assembly and order the plurality of fibers in the second assembly in the predetermined sequence.

In general, in one or more aspects, the disclosure relates to a fiber sorting system that includes a first assembly, an insert, a plate of the first assembly that includes the insert, a second assembly, a computing system, and a control application. The control application executes on the computing system. An initial sequence of a plurality of fibers in the first assembly is obtained. A set of key combinations is identified from the initial sequence and a predetermined sequence. The second assembly is slid across the first assembly. The set of key combinations is actuated to move the plurality of fibers from the first assembly to the second assembly and order the plurality of fibers in the second assembly in the predetermined sequence. Movement of a key of the first assembly is limited with the insert to the plate of the first assembly.

Other aspects of the invention will be apparent from the following description and the appended claims.

DETAILED DESCRIPTION

Figure 1A:
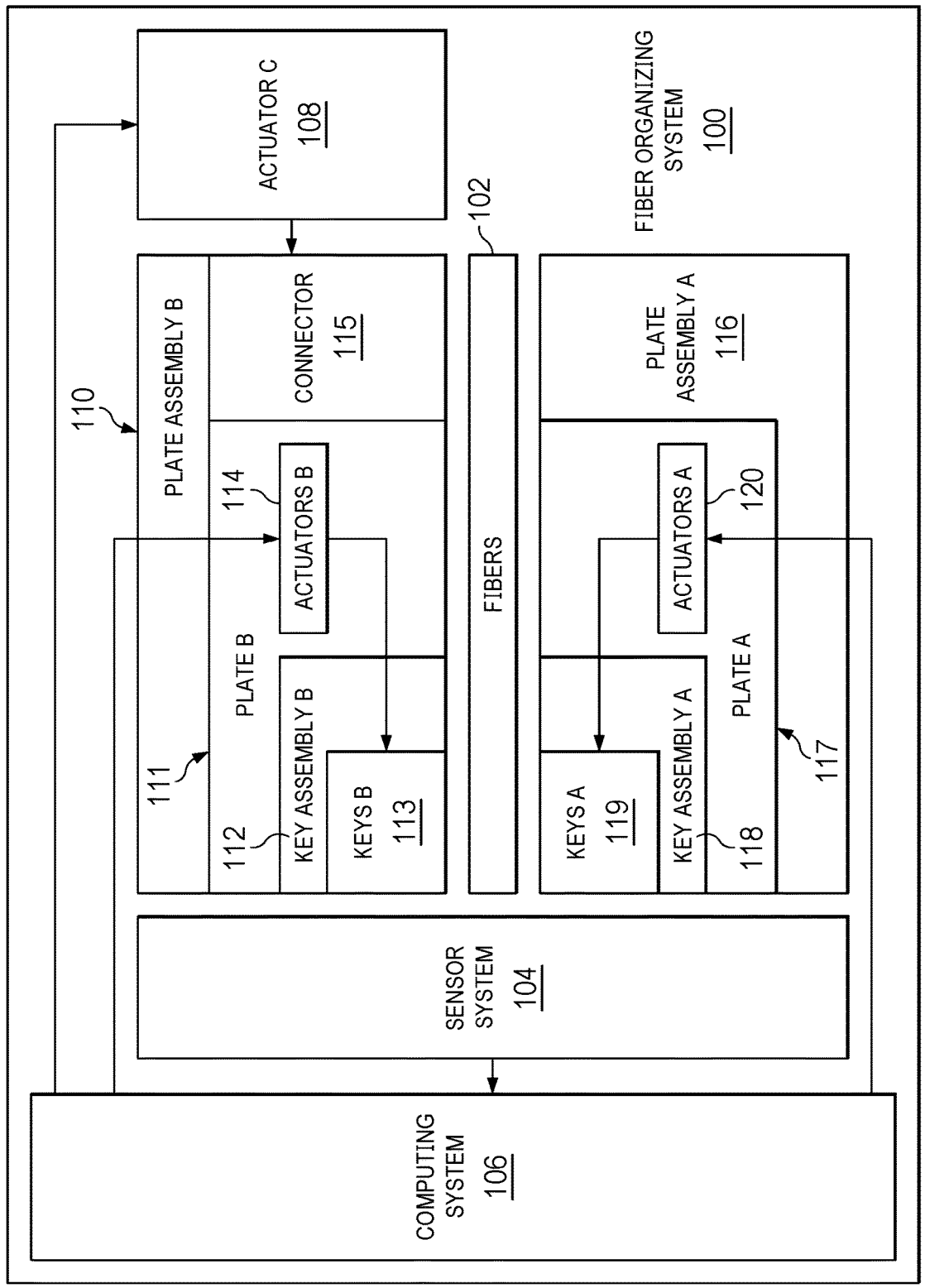
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure relates to fiber optic cable manufacturing, generally, and more specifically, to a system and method for organizing fiber optic cables.

In general, embodiments of the disclosure automatically organize optical fibers from a random sequence to a predetermined. Automatically organizing the optical fibers reduces the amount of time taken to construct an optical cable that includes multiple optical fibers.

Optical fibers are used in communications for transmission over longer distances and higher data rates than electrical cables, exhibit less transmission loss and are not subject to electromagnetic interference. Optical fibers include a core surrounded by a cladding material. The fibers may be manufactured as single fibers and may be fabricated with multiple fibers in a ribbon referred to as a ribbon fiber. A coating may be present over the cladding and a cable jacket, which may comprise a plastic/polymer material over the coating enclosing the fiber optic cable assembly. The use of ribbons allows for increased density of transmission media above that available with single fiber cables.

Joining optical fibers with low loss is a complex and high precision process. Joining optical fibers requires careful and precise cleaving of the fibers, alignment of the fiber cores, and coupling of the cores. One way in which the fibers are connected to end use equipment is by the use of connectors.

Fiber optic cables can have a range of connector types, including a multi-fiber push on (MPO) connector, referred to as an MPO. An MPO may provide 8 to 32 fiber connections in a space of about 0.1×0.25 inches.

MPO-based fiber cables provide higher value to fiber cable manufacturers. For example, a 144-fiber cable, which is a popular and high value industry configuration, may include twelve MPO-12 connectors at one end with each MPO-12 connector handling twelve fibers. Such a cable supports high density, high fiber count requirements emerging in the industry, such as high density data centers and 5G networks.

For MPO terminations, delicate, intricate, and very small form factor operations are used. The termination process may include preparing the ribbon fiber for stripping and stripping the fiber. The stripped ribbon fiber is then cleaned and cleaved to prepare the ends of the optical fibers.

The prepared fibers are then organized and inserted into the MPO connector ferrule. The small size and form factor of the ferrule may be about 0.1×0.25 inches in size. The ribbon fiber is then inserted into the MPO ferrule and checked for proper alignment.

An adhesive is then applied to the fiber in the ferrule to pot the ribbon fibers in place. The application of adhesive may be automated through use of an adhesive dispensing system. The ribbon fiber with the ferrule is then placed in a curing fixture and positioned in a curing oven.

Once the adhesive is cured, the ribbon fiber with the ferrule (referred to as the ribbon assembly) is loaded into a laser cleaver to cleave the ends of the fibers beyond the end of the ferrule.

Following cleaving, the ribbon fiber is loaded into a polisher and extensively polished. The ribbon fiber (assembly) is then tested, and then the cable is ready for further fabrication.

Accordingly, there is a need for an automated system and method for terminating fiber optic cables, and specifically, ferrules to optical fibers and fiber ribbons. Desirably, such a system and method are efficient and produce a high quality, repeatable termination with savings in time and cost. More desirably still, such a system and method may be transportable so that custom size (length) cables can be manufactured as needed, and may be fabricated locally, to suit the requirements of the end user.

Figure 1B:
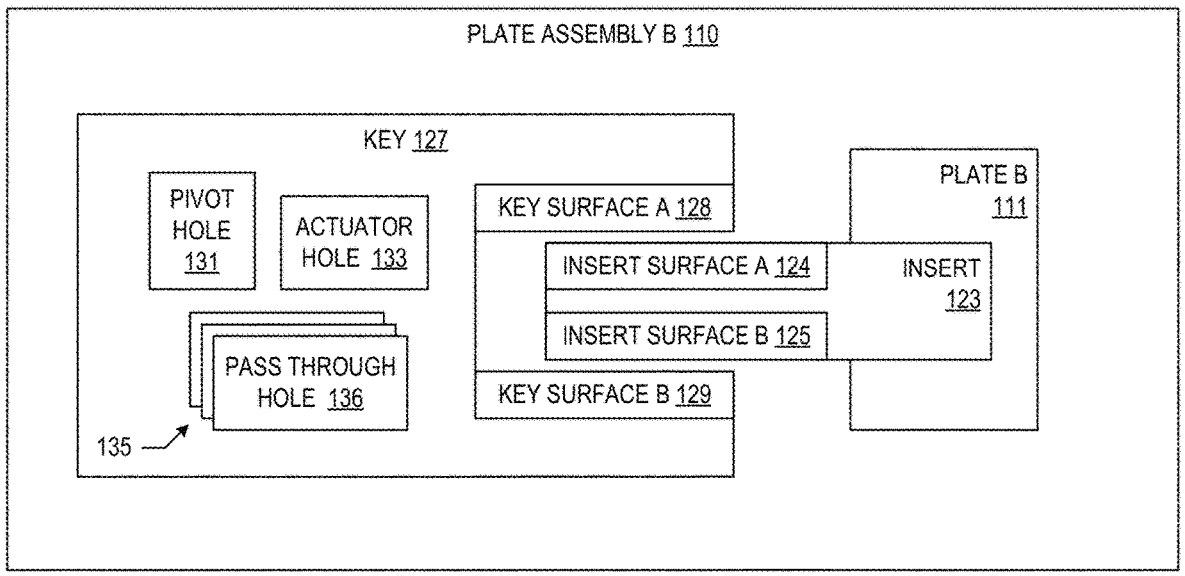
Figure 1C:
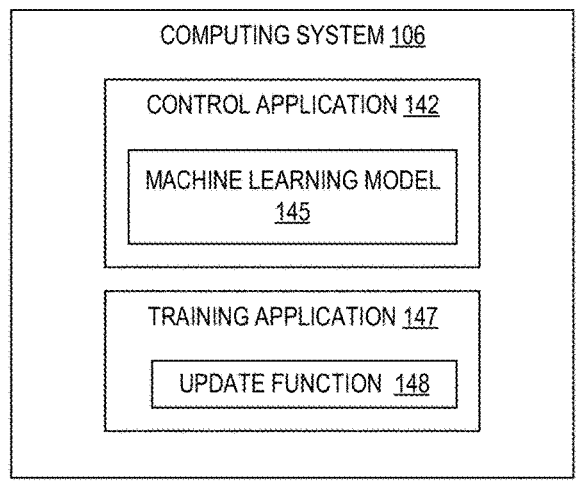
Figure 1D:
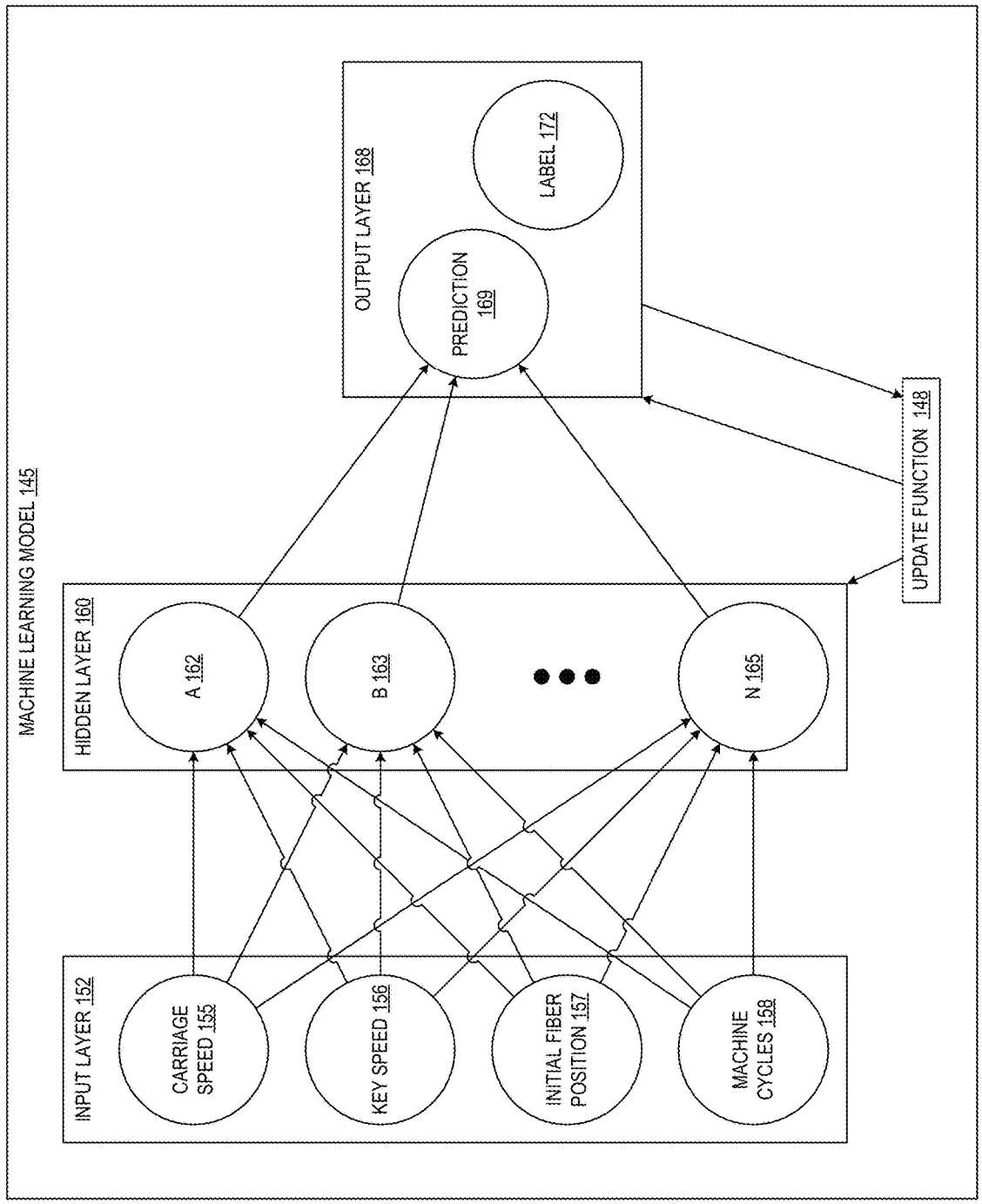

FIGS. 1A, 1B, 1C, and 1D show diagrams of systems that are in accordance with the disclosure. FIG. 1A shows the fiber organizing system (100). FIG. 1B shows the plate assembly B (110). FIG. 1C shows the computing system (106). FIG. 1D shows the machine learning model (145). The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to fiber organizer technology and computing systems. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the fiber organizer system (100) organizes the fibers (102) from an initial sequence to a predetermined sequence. The fiber organizer system (100) receives the fibers (102), which may be in a random initial sequence, and reorders the fibers (102) into a predetermined sequence.

The fibers (102) are optical fibers configured to propagate optical signals. In one embodiment, the fibers (102) may be coded with different colors and patterns to uniquely distinguish and identify the different individual fibers that make up the fibers (102).

The sensor system (104) is a part of the fiber organizer system (100) that monitors the fibers (102). In one embodiment, the sensor system (104) includes a camera that images the fibers (102), a mirror to image the fibers (102), and a set of light sources (e.g., light emitting diodes) to illuminate the fibers (102).

The computing system (106) is a collection of computing devices that control the fiber organizer system (100). The computing system (106) may include an embedded computer (connected to the sensor system (104) and the actuators A (120), B (114), and C (108)), a personal computer (connected to the embedded computer), a server computer (connected to the personal computer), etc. The computing system (106) receives data from the sensor system (104), which is used to control the actuators A (120), B (114), and C (108). The computing system (106) may include embodiments of the computing system (500) of FIG. 5A.

The actuator C (108) is a component that moves the plate assembly B (110) relative to the plate assembly A (116). In one embodiment, the actuator C (108) includes a stepper motor that makes precision movements that are less than the diameter of the fibers (102).

The plate assembly B (110) is a collection of components, including the plate B (111), that are moved by the actuator C (108) with respect to the plate assembly A (116). The plate assembly B (110) includes the plate B (111) and the connector (115).

The connector (115) connects the plate B (111) to the actuator C (108). The connector (115) may include a hinge to open the fiber organizer system (100) for entry of the fibers (102) between the plate assembly B (110) and the plate assembly A (116).

The plate B (111) is a component to which the key assembly B (112) and the actuators B (114) are mounted. The plate B (111) is positioned adjacent to the plate A (117).

The key assembly B (112) is a collection of components that include and affix the keys B (113) to the plate B (111). In one embodiment, the key assembly B (112) is structured for the keys B (113) to rotate and move the fibers (102) between the plate assemblies A (116) and B (110).

The keys B (113) manipulate the fibers (102), in conjunction with the keys A (119), to move the fibers (102). In one embodiment, after the fibers (102) are initially placed within the plate assembly A (116), the fibers are moved out of the plate assembly A (116) and into the plate assembly B (110). Each of the keys B (113) are coupled to and moved by the actuators B (114). In one embodiment, a width of one of the keys B (113) (referred to as a key width) is about equal to a diameter of one of the fibers (102). For example, the key width may be 0.010 inches (0.250 millimeters) for a fiber with a fiber diameter of 250 microns (0.0098 inches). Different key widths may be used for different fiber widths.

The actuators B (114) are components that move the keys B (113). In one embodiment, the actuators B (114) include a solenoid or pneumatic cylinder for each of the keys B (113).

The plate assembly A (116) is a collection of components, including the plate A (117), that may remain stationary with respect to the plate assembly A (116). The plate assembly A (116) includes the plate A (117).

The plate A (117) is a component to which the key assembly A (118) and the actuators A (120) are mounted. The plate A (117) is positioned adjacent to the plate B (111).

The key assembly A (118) is a collection of components that include and affix the keys A (119) to the plate A (117). In one embodiment, the key assembly A (118) is structured for the keys A (119) to rotate and move the fibers (102) between the plate assemblies A (116) and B (110).

In one embodiment, the fibers (102) are placed into the plate assembly A (116) in the initial sequence (in a random order). The fibers (102) are then moved from the plate assembly A (116) to the plate assembly B (110) and positioned into a subsequent sequence that matches the predetermined sequence. Alternatively, the fibers (102) may be initially received by the plate assembly B (110) (positioned in the initial random sequence) and then moved to the plate assembly A (116) (positioned in the predefined sequence). In one embodiment, after the fibers (120) are organized into the predetermined sequence, the fibers (120) may be moved back to the plate assembly that initially received the fibers (120).

The keys A (119) manipulate the fibers (102), in conjunction with the keys B (113), to move the fibers (102) from the plate assembly A (116) to the plate assembly B (110). Each of the keys A (119) are coupled to and moved by the actuators A (120).

The actuators A (120) are components that move the keys A (119). In one embodiment, the actuators A (120) include a solenoid or pneumatic cylinder for each of the keys A (119).

Turning to FIG. 1B, an embodiment of the plate assembly B (110) is further described. The plate B (111), of the plate assembly B (110), includes the insert (123). The insert (123) may be formed to more precise tolerances than the plate B (111). For example, the insert (123) may be formed with tolerances of about ±0.005 millimeters and the plate may be formed with tolerances of about ±0.02 millimeters. The insert (123) includes the insert surfaces A (124) and B (125). The insert surfaces A (124) and B (125) limit the movement of the key (127) in combination with the key surfaces A (128) and B (129).

The key (127) is one of the keys B (113) (of FIG. 1A). The key (127) includes the key surfaces A (128) and B (129). The key surfaces A (128) and B (129), in conjunction with the insert surfaces A (124) and B (125), limit the movement of the key (127).

The key (127) includes multiple holes, including the pivot hole (131), the actuator hole (133) and the pass through holes (136). The pivot hole (131) is the hole about which the key (127) pivots or rotates.

The actuator hole (133) is the hole through which the key (127) is connected to one of the actuators B (114) (of FIG. 1A). In one embodiment, the connection from one of the actuators B (114) (of FIG. 1A) to the key (127) may be formed with a rocker arm.

The pass through holes (135), including the pass through hole (136), are the holes through which connectors between the other keys (of the keys B (113) of FIG. 1A) and the other actuators B (114) (of FIG. 1A) pass. The pass through holes (135) are configured to allow the other connectors through the key (127) without transferring forces from the other connectors and actuators B (114) (of FIG. 1A) to the key (127). The pass through holes (135) isolate the key (127) from the movements of the connectors for the other keys in the key assembly B (112).

Turning to FIG. 1C, an embodiment of the computing system (106) is further described. The computing system (106) controls the fiber organizer system (100) (of FIG. 1A) using multiple software components. The software components include the control application (142) and the training application (147).

The control application (142) is a software component of the fiber organizer system (100). The control application (142) may be stored in memory of the computing system (106) and execute on processors of the computing system (106). The control application (142) includes the machine learning model (145).

The machine learning model (145) is a software of the fiber organizer system (100). In one embodiment, the machine learning model (145) generates predictions of labels for the fibers (102) (of FIG. 1A) after the fibers (102) are organized.

The training application (147) is a software of the fiber organizer system (100). The training application (147) trains the machine learning model (145). The training application (147) trains the machine learning model using the update function (148), which is another software component of the fiber organizer system (100).

Turning to FIG. 1D, an embodiment of the machine learning model (145) is further described. The machine learning model (145) may be used to control parameters of the fiber organizer system (100) (of FIG. 1A). The machine learning model (145) may be a neural network that includes the input layer (152), the hidden layer (160), and the output layer (168). Other types, architectures, and structures of machine learning models may be used, including recurrent neural networks, convolutional neural networks, state vector machines, logistic regression, etc. Data is input to the input layer (152) which passes through the hidden layer (160) to the output layer (168) to generate a final output, the prediction (169). The prediction (169) may be a prediction of whether the fibers are in the correct order based on the data entered in the input layer (152).

The input layer (152) receives the inputs to the machine learning model (145). In one embodiment, the input layer (152) receives the carriage speed (155), the key speed (156), the initial fiber position (157), and the number of machine cycles (158). In one embodiment, the carriage speed (155) is the speed of the plate B (111) relative to the plate A (117). The key speed (156) is the speed for the movement of the keys A (119) and B (113). The initial fiber position (157) identifies the initial sequence of fibers to be organized by the system (100) (of FIG. 1A). The number of machine cycles identifies the number of times that the fiber organizing system (100) (of FIG. 1A) has organized a set of fibers.

The hidden layer (160) is a layer of the machine learning model (145). The hidden layer (160) includes the nodes A (162), B (163), through N (165) that receive the inputs (155) through (158) from the input layer. In one embodiment, the input layer (160) is fully connected to the input layer (152) with each of the nodes A (162) through N (165) corresponding to a weighted sum of the inputs (155) through (158) from the input layer (152).

The output layer (168) is a layer of the machine learning model (145). The output layer includes the prediction (169). In one embodiment, the output layer (168) is fully connected to the hidden layer (160) with the prediction (169) corresponding to a weighted sum of the outputs from the nodes A (162) through N (165) of the hidden layer (160). In one embodiment, the prediction (169) identifies a probability that a sequence of fibers is reorganized to match the predetermined sequence when the carriage speed (155), the key speed (156), the initial fiber position (157), and the machine cycles (158) are used.

During training, the prediction (169) from the output layer (168) may be compared with the label (172) with the update function (148). In one embodiment, the label (172) is a binary value with a value of "1" indicating that the subsequent sequence matches the predetermined sequence and a value of "0" indicating that the subsequent sequence does not match the predetermined sequence.

The error from the comparison of the prediction (169) to the label (172) may be backpropagated into the machine learning model (145) to improve the accuracy of the machine learning model (145). For example, the update function (148) may backpropagate the error from the comparison to the weights used by the hidden layer (160) and the output layer (168).

Figure 2:
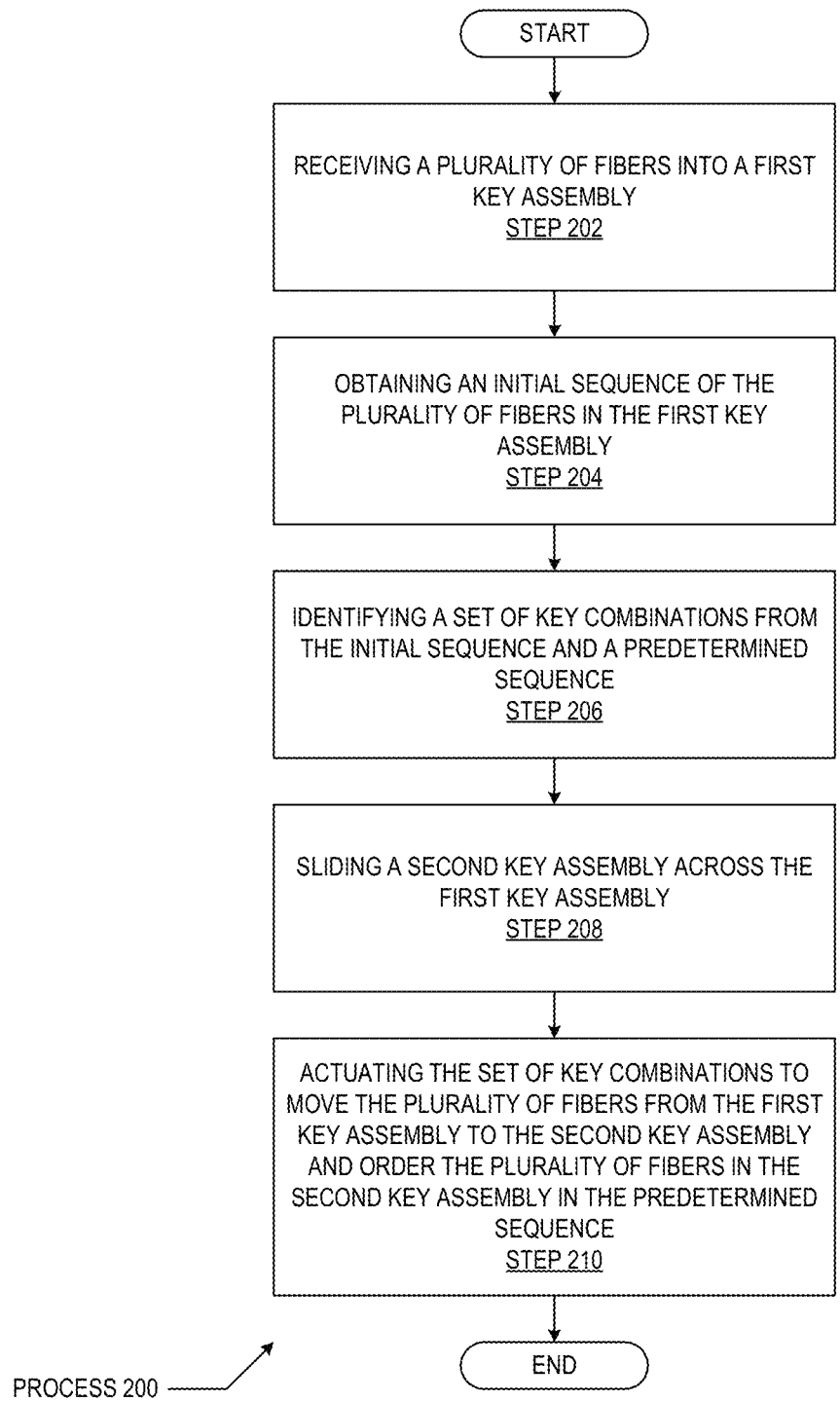
FIG. 2 shows a flowchart in accordance with disclosed embodiments.

FIG. 2 is a flowchart of the process (200). The embodiments of FIG. 2 may be combined and may include or be included within the features and embodiments described in the other figures of the application. The features of FIG. 2 are, individually and as an ordered combination, improvements to fiber organizer technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Continuing with FIG. 2, the process (200) implements organizes fibers. The process (200) is performed by a fiber organizer system that includes a computing system.

At Step 202, fibers are received into a first assembly (e.g., a first plate assembly or key assembly). Reception of the fibers may include the process of automatically opening the fiber organizer system, inserting the fibers into an assembly (forming a random sequence of the fibers), and closing the fiber organizer system with the fibers in key assembly. For each step, the fiber organizer system may include sensors that indicate the process through each step.

At Step 204, an initial sequence of the fibers in the first assembly is obtained. The initial sequence may be obtained by the sensor system of the fiber organizer system.

In one embodiment, the fibers extend from the first assembly and are imaged with a camera system of the sensor system. The camera system generates an initial image that captures the initial sequence of the fibers. For example, the computing system may identify the position of each fiber from the initial image and identify a code from a color (red, yellow, green, white, etc.) or pattern (e.g., striped) on the fibers.

In one embodiment, the fibers are imaged in front of a split background. The split background includes two different backgrounds with two different colors. For example, one color may be black and another color may be white. The split background prevents fibers having the same color as the background from "disappearing" into the background. Using the split background with two colors allows the image recognition system to identify the location of each fiber.

In one embodiment, the fibers are imaged using a mirror module. The mirror module includes a first opening and a second opening. The second opening is surrounded with light sources (also referred to as stadium lighting). The mirror module also includes a mirror disposed between the first opening and the second opening and may be disposed at about a 45 degree angle to each opening. The first opening may allow light to pass between the fibers and the mirror. The second opening may allow light to pass from the mirror to the camera used to image the fibers.

In one embodiment, a pulse width modulation value is adjusted for the light sources used to image the fibers and are imaged using the pulse width modulation value. The pulse width modulation value may be adjusted using an ambient lighting value and a movement speed. The ambient lighting value may include multiple values for the ambient light around the fibers being imaged, including values for hue, chroma, saturation, lightness, red, green, blue, etc. The pulse width modulation value identifies a duty cycle for the light from the light sources from a range 0% to 100%. The duty cycle identifies how long the light is on. For example, with a cycle length of 250 milliseconds a duty cycle of 20% indicates that the light is on for 50 milliseconds and off for 200 milliseconds during the cycle.

In one embodiment, the fibers are imaged with a diffusion filter in the path between the fibers and the camera. One or more filters may be placed along the path, including in front of the camera, in front of the light sources (e.g., light emitting diodes LEDs), in front of the fibers, etc.

At Step 206, a set of key combinations is identified from the initial sequence and a predetermined sequence. In one embodiment, the computing system of the fiber organizer system processes the initial image to identify the set of key combinations. The key combinations organize the fibers from the initial sequence to the predetermined sequence.

In one embodiment, a key combination includes a first key from the first key assembly and a second key from the second key assembly. The first key corresponds to a position of a fiber the initial sequence and the second key corresponds to a position of the fiber in the predetermined sequence.

At Step 208, a second assembly is slid across the first assembly. The second assembly is slid with respect to the first assembly at a carriage speed. The sliding motion may be produced by applying a force to one or both of the plate assemblies to which the key assembles are mounted. The sliding may be continuous. In one embodiment, the sliding may stop and start each time a fiber (or group of fibers) is transferred from one assembly to the other assembly.

At Step 210, the set of key combinations are actuated to move the fibers from the first assembly to the second assembly and order the plurality of fibers in the second assembly in the predetermined sequence. The actuation may be performed contemporaneously with the sliding.

In one embodiment, actuating the key combination moves a fiber from the first assembly to the second assembly and places the fiber into the second assembly in accordance with the predetermined sequence. The key combination may include the keys for multiple fibers.

In one embodiment, when two keys on opposite sides of a fiber are activated to move the fiber, movement of the leading key may be triggered before movement of the trailing key is triggered. The leading key is the key in the subsequent position to where the fiber will be moved. The trailing key is the key that is pushing the fiber from the initial position into the subsequent position. The leading key is triggered to move a few milliseconds before the trailing key. In one embodiment, the leading key is triggered about 20 to 80 milliseconds before the trailing key. The trailing key pushes the fiber into the subsequent position. Triggering the leading key before the trailing key creates a proper movement of the fiber from the initial position in the first assembly to the subsequent position in the second assembly and prevent the fiber from being miss-located.

In one embodiment, the actuating is based on a position of the first assembly with respect to the second assembly. When the first assembly and the second assembly are aligned with a first key (corresponding to a fiber in the initial sequence), the fiber, and a second key (corresponding to the fiber in the predetermined sequence), the key combination is triggered.

In one embodiment, movement of a key, of an assembly, is limited with an insert to a plate of a plate assembly. Movement of the key may be stopped when a surface of the key contacts a surface of the insert.

In one embodiment, the plurality of fibers extending from the second assembly is imaged, after sliding the second assembly, to generate a subsequent image. The subsequent image captures the positions of the fibers in the second assembly. A subsequent sequence of the plurality of fibers may be determined from the subsequent image. The subsequent sequence may then be verified with the predetermined sequence using the subsequent image. When the order of the fibers in the subsequent sequence is the same as the order of the fibers in the predetermined sequence, the sequences are matched and verified.

In one embodiment, a machine learning model is trained to generate a prediction of a training order of training fibers in response to a training carriage speed, a training key speed, a training fiber order, and a training cycle time. The prediction identifies the probability that the subsequent sequence of the fibers in the second assembly matches with the predetermined sequence for the fibers.

In one embodiment, a carriage speed for the sliding and a key speed for the actuating is selected using the machine learning model, the initial sequence, and a number of machine cycles. The machine learning model may be used to generate multiple predictions from different carriage speeds and key speeds. The prediction corresponding to the highest carriage and key speeds while also meeting a minimum threshold probability (e.g., a 99% probability) may be selected. The carriage and key speeds from the selected prediction may then be used to slide the key assemblies and actuate the key combinations.

FIGS. 3A through 9 show examples of systems, sequences, and interfaces that organize fibers. FIGS. 3A-3F show the fiber organizer system (300). FIGS. 4A-4N show a sequence of organizing fibers. FIGS. 5A-5B show a diagram of the fiber organizer system (500). FIGS. 6, 7, and 8A-8B show examples of fiber organizers. FIG. 9A-9B show examples of user interfaces of fiber organizer systems. The embodiments shown in FIGS. 3A through 9 may be combined and may include or be included within the features and embodiments described in the other figures of the application. The features and elements of FIGS. 3A through 9 are, individually and as a combination, improvements to fiber organizer technology and systems. The various features, elements, widgets, components, and interfaces shown in FIGS. 3A through 9 may be omitted, repeated, combined, and/or altered as shown. Accordingly, the scope of the present disclosure should not be considered limited to the specific arrangements shown in FIGS. 3A through 9.

Figure 3A:
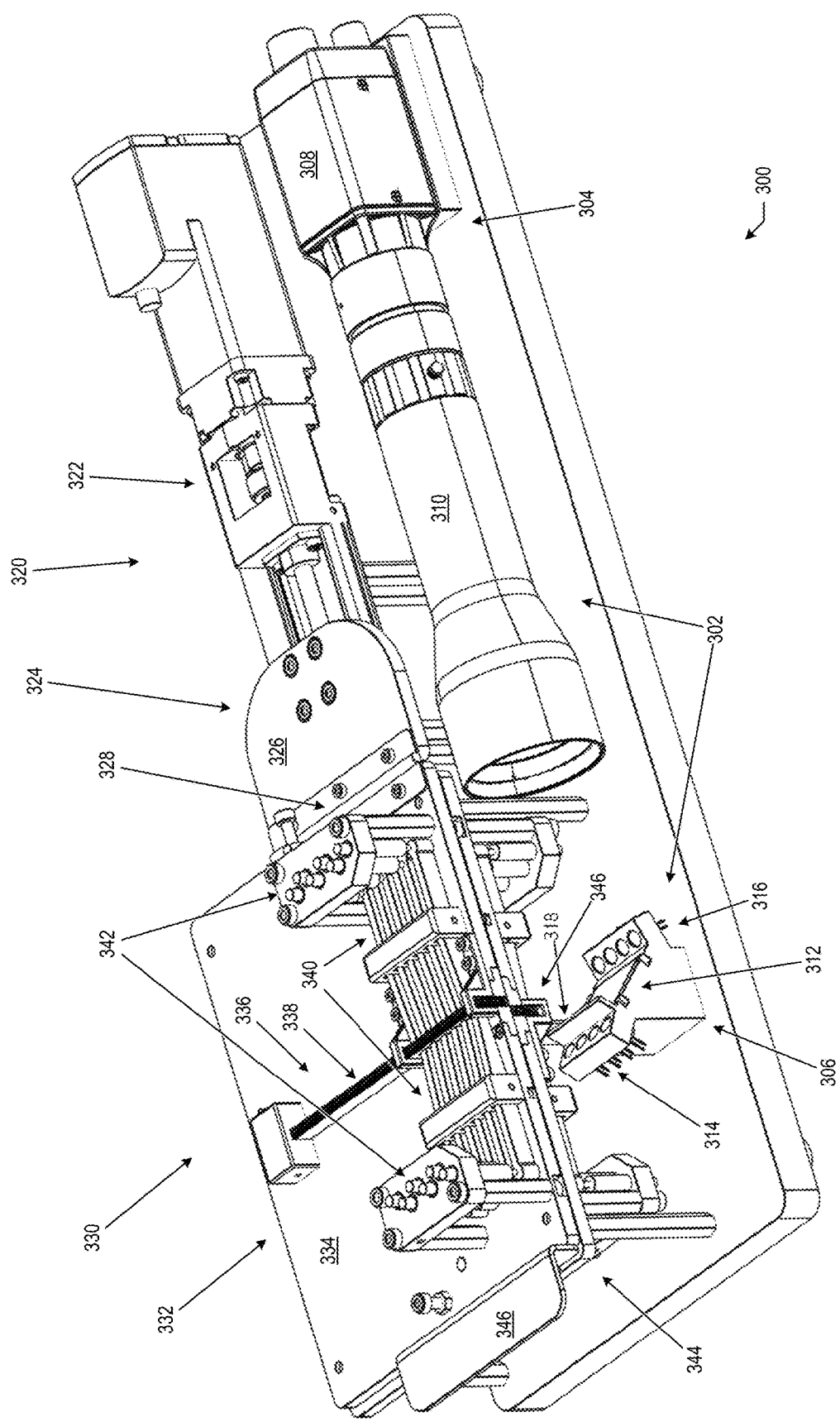
FIG. 3A, FIG. 3B, FIG. 3C, FIG. 3D, FIG. 3E, FIG. 3F, FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, and FIG. 4N show examples in accordance with disclosed embodiments.

Turning to FIG. 3A, a perspective view of the fiber organizer system (300) is illustrated. The fiber organizer system (300) organizes fibers (not shown) from an initial sequence to a predetermined sequence. The fiber organizer system (300) includes the sensor system (302), the actuator system (320), and the fiber manipulation system (330).

The sensor system (302) obtains the initial and subsequent sequences of the fibers that are organized by the fiber organizer system (300). The sensor system (302) includes the camera system (304) and the light block (306).

The camera system (304) includes the camera (308) and the lens (310). The lens (310) focuses the light from the fibers onto the sensor of the camera (308). The camera (308) includes a sensor that converts the light to electrical signals that are recorded and processed to generate images of the fibers.

The light block (306) generates and conditions the light used by the sensor system (302) to capture images of the fibers. The light block (306) includes the mirror (312), the first row of light emitting diodes (LEDs) (314), the second row of LEDs (316), and the protrusion (318).

The mirror (312) is a first surface mirror. The mirror (312) reflects light from the fibers into the lens (310) of the camera system (304).

The first and second rows of LEDs (314) and (316) provide light that reflects off the fibers and onto the mirror (312). The first row of LEDs (314) is behind the protrusion (318) to prevent light from the first row of LEDs (314) from directly entering the camera system (304).

The actuator system (320) slides the upper and lower key assemblies (336) and (346) of the fiber organizer system (300) with respect to each other. The actuator system (320) includes the motor (322) and the connector (324).

The motor (322) pushes and pulls the upper plate assembly (332) to slide the upper key assembly (336). The motor (322) is connected to the upper plate assembly (332) through the connector (324).

The connector (324) connects the motor (322) to the upper plate assembly (332). The connector (324) includes the connector plate (326) and the hinge (328). The connector plate (326) connects between the motor (322) and the hinge (328) to transfer the forces from the motor (322) to the upper plate assembly (332).

The hinge (328) connects between the connector plate (326) and the upper plate assembly (332) of the upper plate assembly (332). The hinge (328) provides a pivot point to open and close the fiber organizer system (300) by rotating the upper plate assembly (332) with respect to lower plate assembly (344).

The fiber manipulation system (330) manipulates the fibers to organize the fibers from an initial sequence to a subsequent sequence that matches a predetermined sequence. The fiber manipulation system (330) includes the upper plate assembly (332) and the lower plate assembly (344).

The upper plate assembly (332) is an assembly of components used to manipulate the fibers. The upper plate assembly (332) opens by rotating up about the pivot point of the hinge (328). The upper plate assembly (332) includes the upper plate (334), the upper key assembly (336), the upper connector arms (340), the upper actuators (342), and the handle (344).

The upper plate (334) is a rigid structure to which the components of the upper plate assembly are attached, including the upper key assembly (336). The upper plate (334) is attached to the connector (324) through the hinge (328).

The upper key assembly (336) includes the upper keys (338). The upper keys (338) are connected through the upper connector arms (340) to the upper actuators (342).

The upper connector arms (340) are rocker arms that connect between the upper keys (338) and the upper actuators (342). The upper connector arms (340) are weighted to be biased to push the upper keys (338) down towards the lower plate assembly (344).

The upper actuators (342) provide the force to move the keys (338). In one embodiment, the upper actuators (342) are pneumatic cylinders.

The lower plate assembly (344) is adjacent to the upper plate assembly (330). The lower plate assembly (344) includes the lower key assembly (346).

Figure 3B:
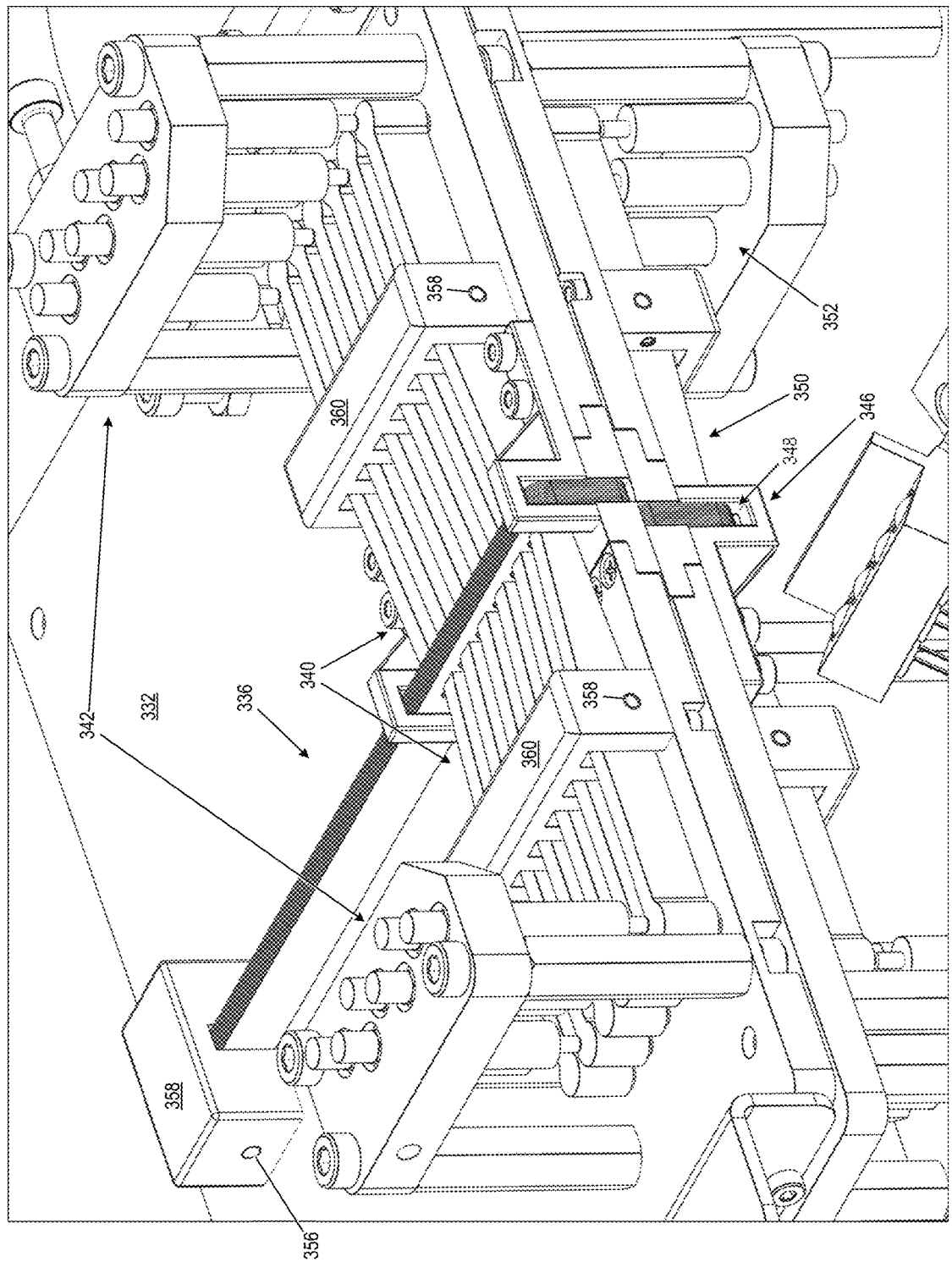

Turning to FIG. 3B, a perspective view of the fiber organizer system (300) is illustrated showing the upper and lower key assemblies (336) and (346). The lower keys (348) of the lower key assembly (346) are connected through the lower connector arms (350) to the actuators (352). The lower connector arms (350) are weighted to be biased to pull the lower keys (348) down and away form the upper plate assembly (332). The lower actuators (352) provide the force to move the lower keys (348).

The upper key assembly (336) includes the upper key pin (356), the upper key cover (358). The upper keys (338) rotate about the upper key pin (356). The upper key cover (358) supports the upper key pin (356).

The upper connector arms (340) include two opposing sets of connector arms that transfer forces from two opposing sets of actuators of the upper actuators (342). The upper connector arms (340) rotate about the upper connector pins (358) that are supported by the upper pin housings (360).

Figure 3C:
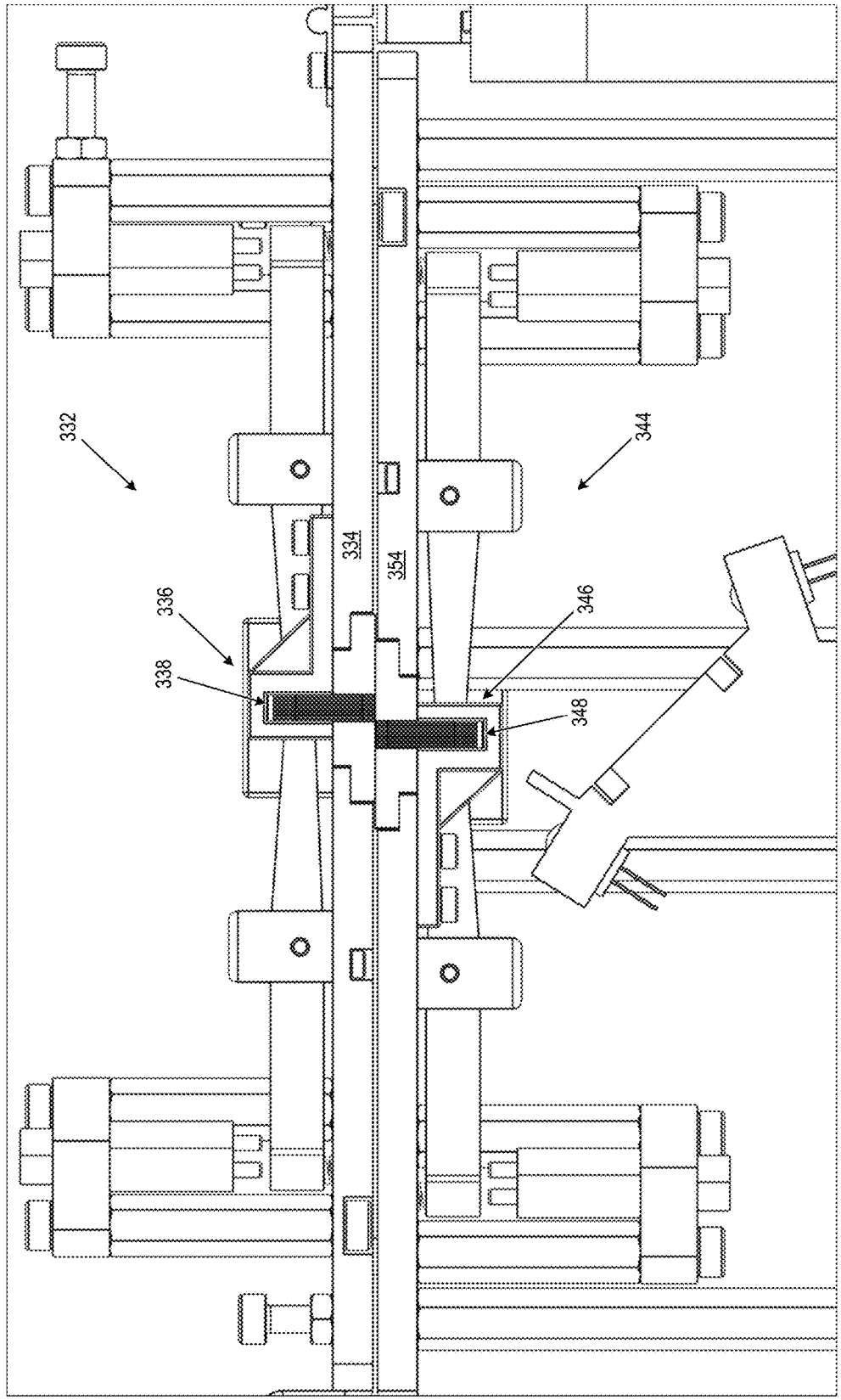

Turning to FIG. 3C, a front view of the fiber organizer system (300) is illustrated showing the upper and lower plate assemblies (332) and (344). The upper and lower plate assemblies (332) and (344) respectively include the upper and lower plates (334) and (354) and the upper and lower key assemblies (336) and (346). The upper and lower plates (334) and (354) are offset from each other by about the combined width of the upper keys (338) of the upper key assembly (336). The combined width of the upper keys (338) is about equal to the combined width of the lower keys (348).

Figure 3D:
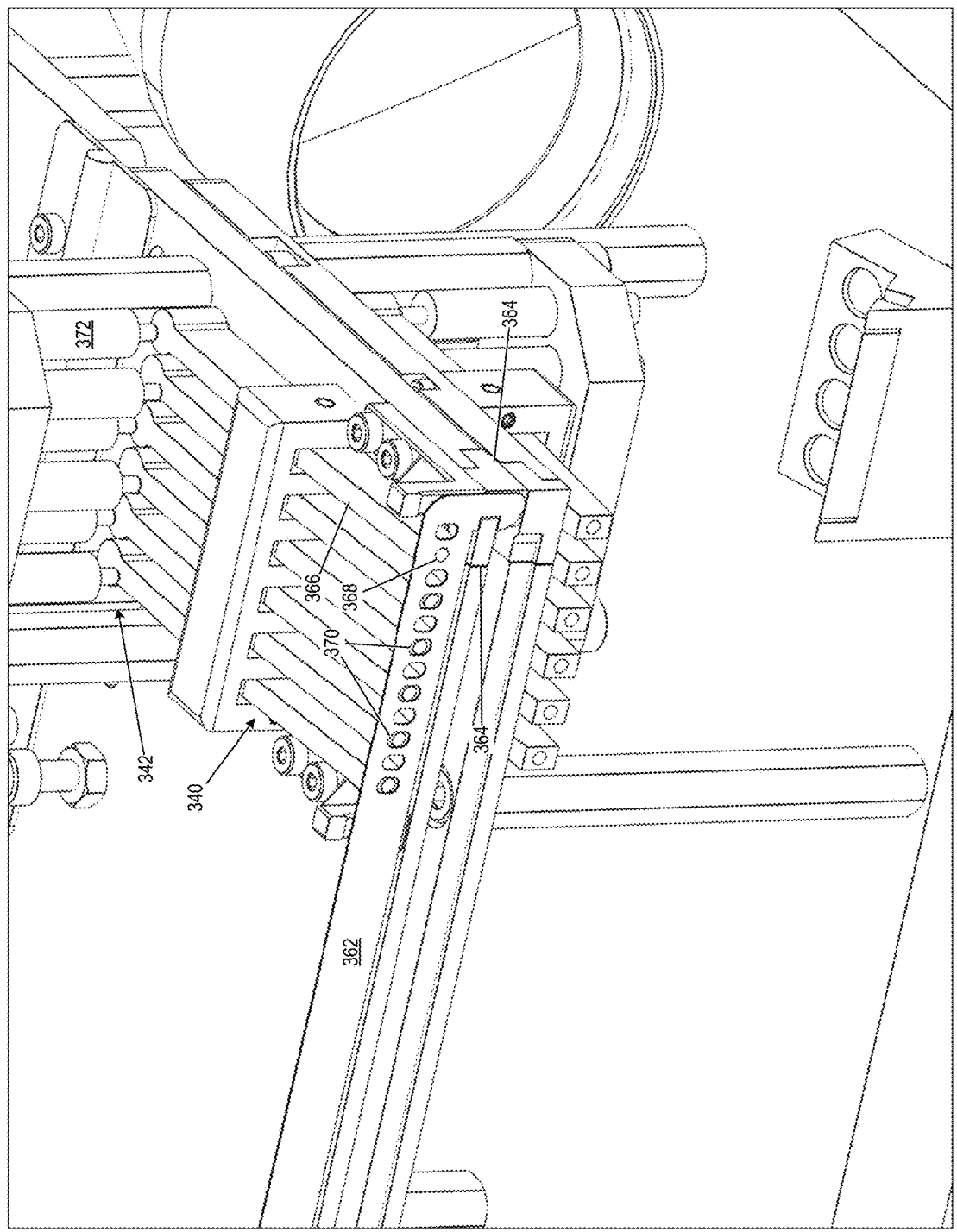

Turning to FIG. 3D, a perspective view of the fiber organizer system (300) is illustrated showing a cross section of the fiber organizer system (300) along the key (362). Movement of the key (362) (as well as the other upper keys (338) of FIG. 3C) is limited by the upper insert (364).

The upper connector arm (366) connects to the key (362) at the actuator hole (368) to transfer force from the upper actuator (372). The pass through holes (370) allow the remaining upper connector arms (340) to pass through the key (362) without transferring forces from the other upper actuators (342).

Figure 3E:
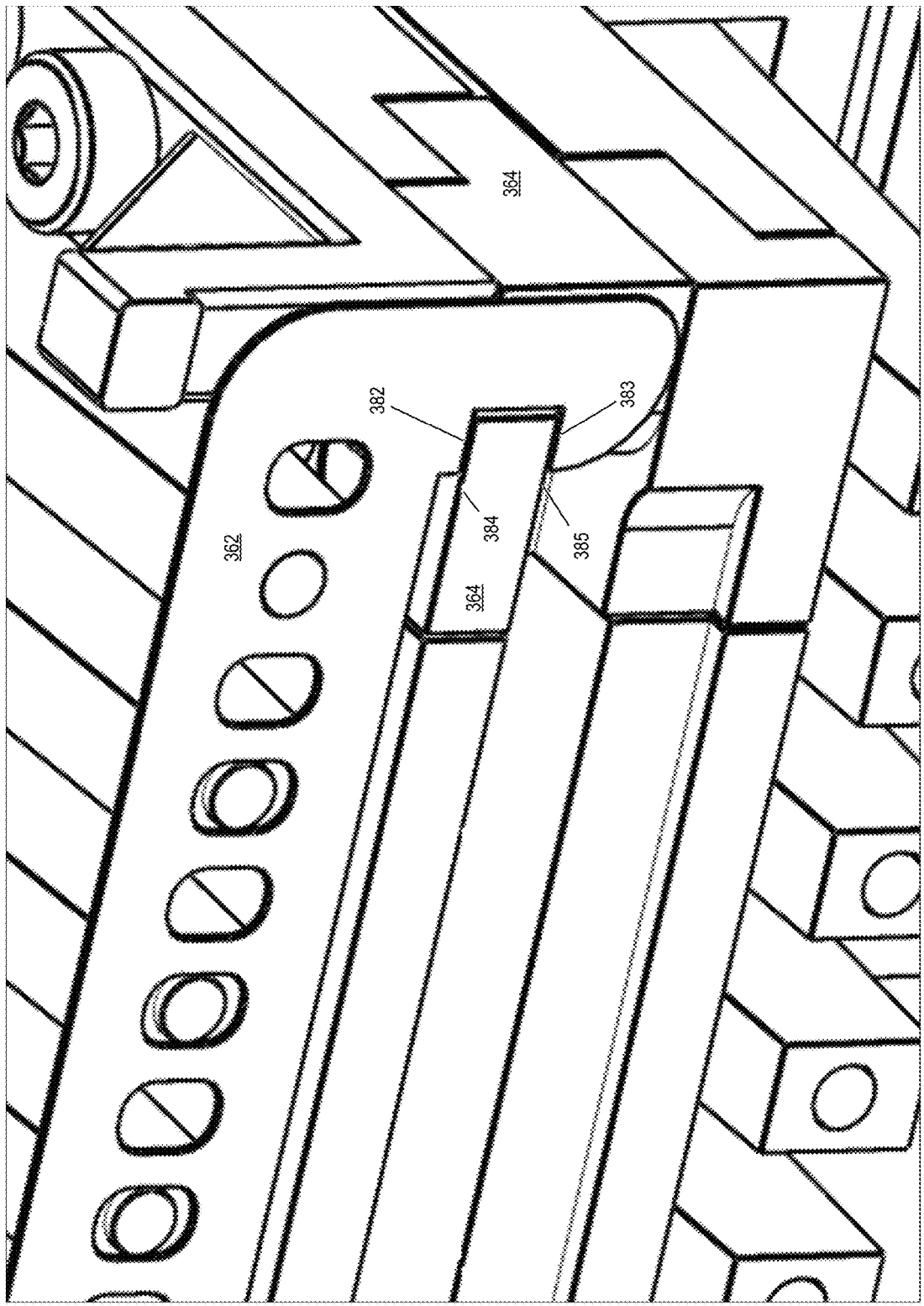

Turning to FIG. 3E, a zoomed perspective view of the fiber organizer system (300) is illustrated showing a cross section of the fiber organizer system (300) along the key (362). Movement of the key (362) is limited by interaction of the upper and lower surfaces (382) and (383) of the key (362) with the upper and lower surfaces (384) and (385) of the insert (364).

Figure 3F:
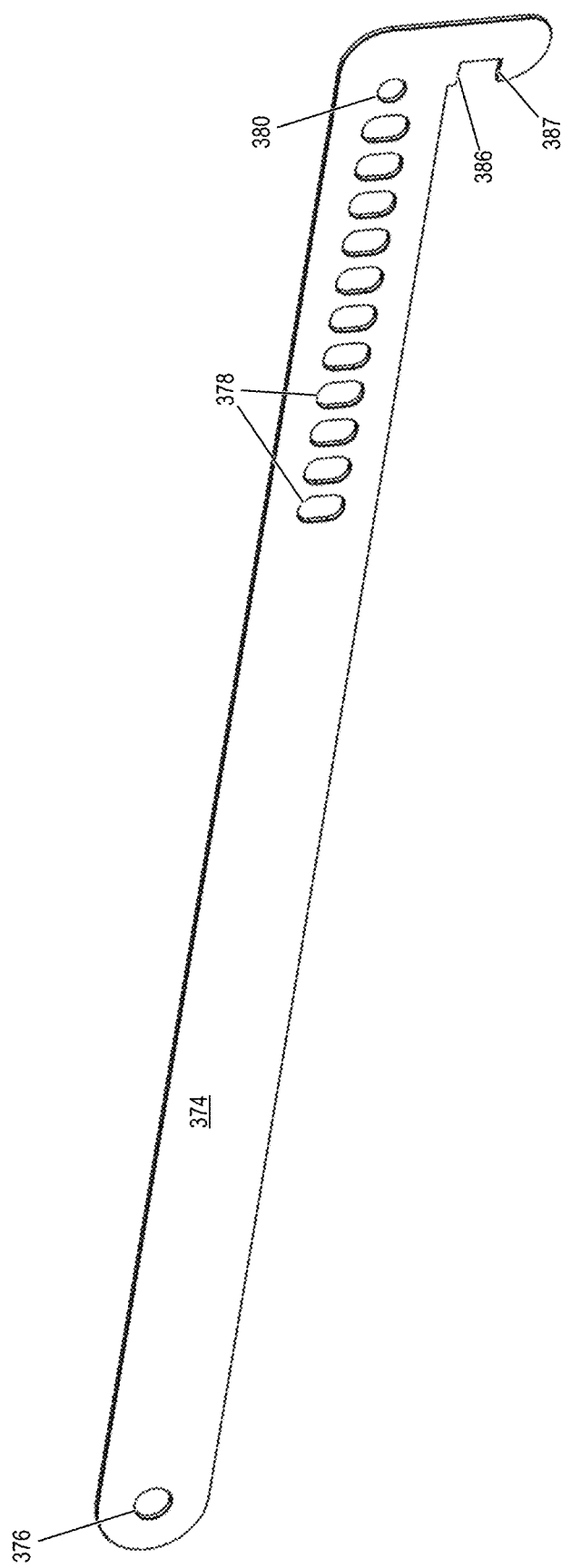

Turning to FIG. 3F, a perspective view of the upper key (374) (of the upper keys (338) of FIG. 3C) is illustrated. The upper key (374) includes the pivot hole (376), the pass through holes (378), and the actuator hole (380). The upper surface (386) limits downward motion of the key (374) and the lower surface (387) limits upward motion of the key (374).

Figure 4A:
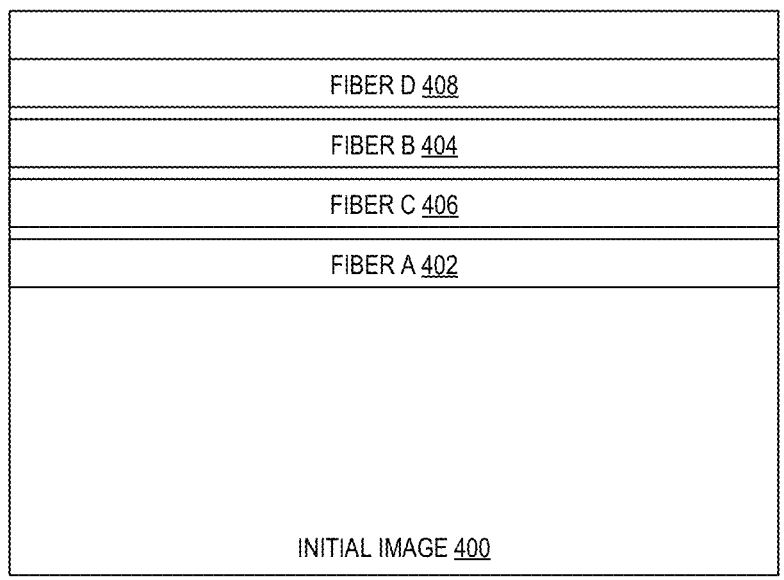
Figure 4B:
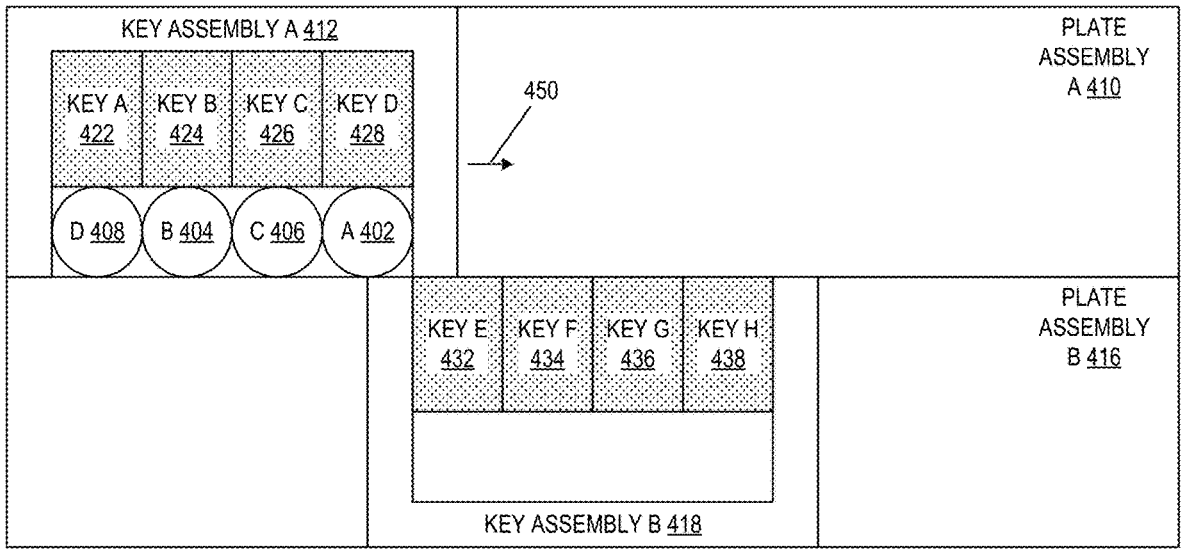
Figure 4C:
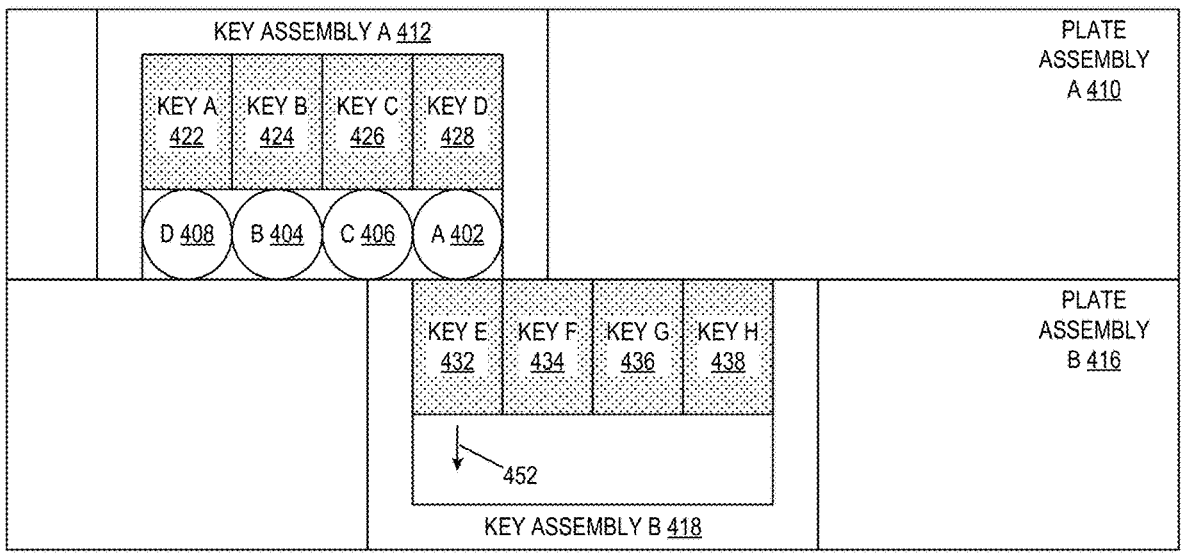
Figure 4D:
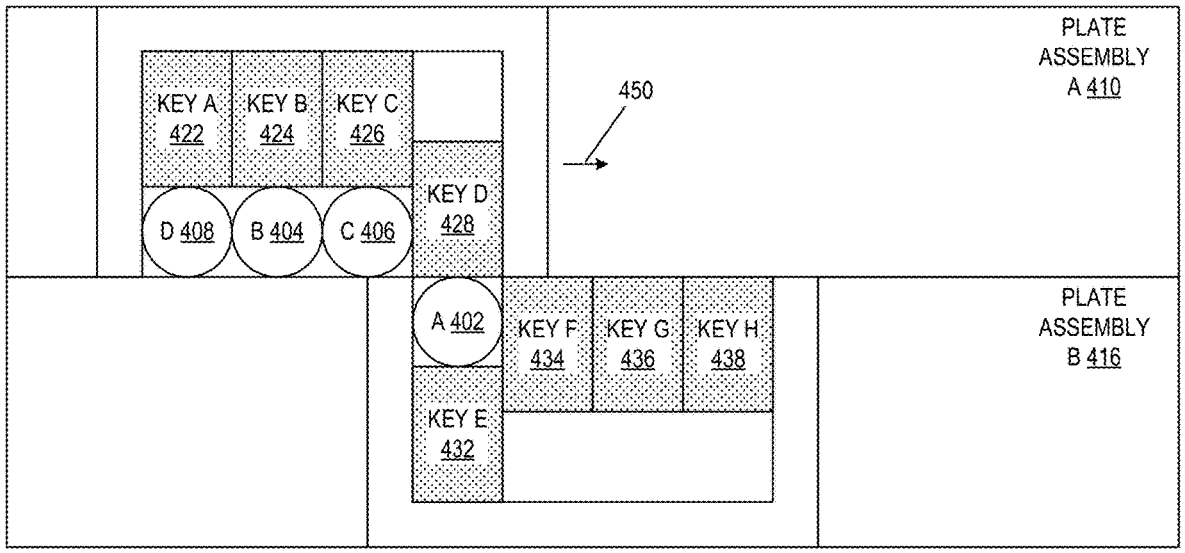
Figure 4E:
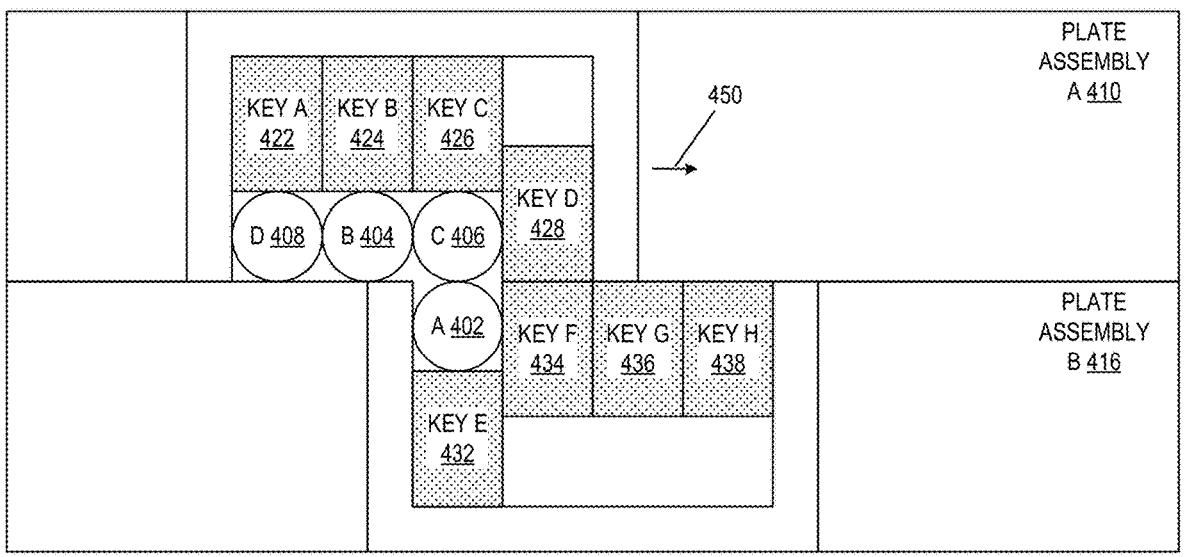
Figure 4F:
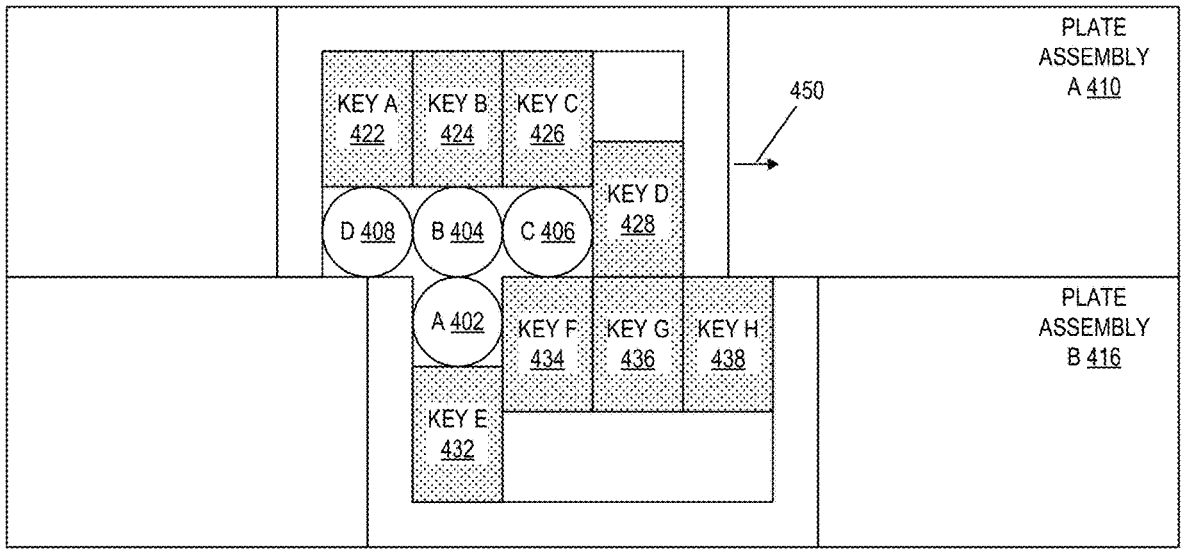
Figure 4G:
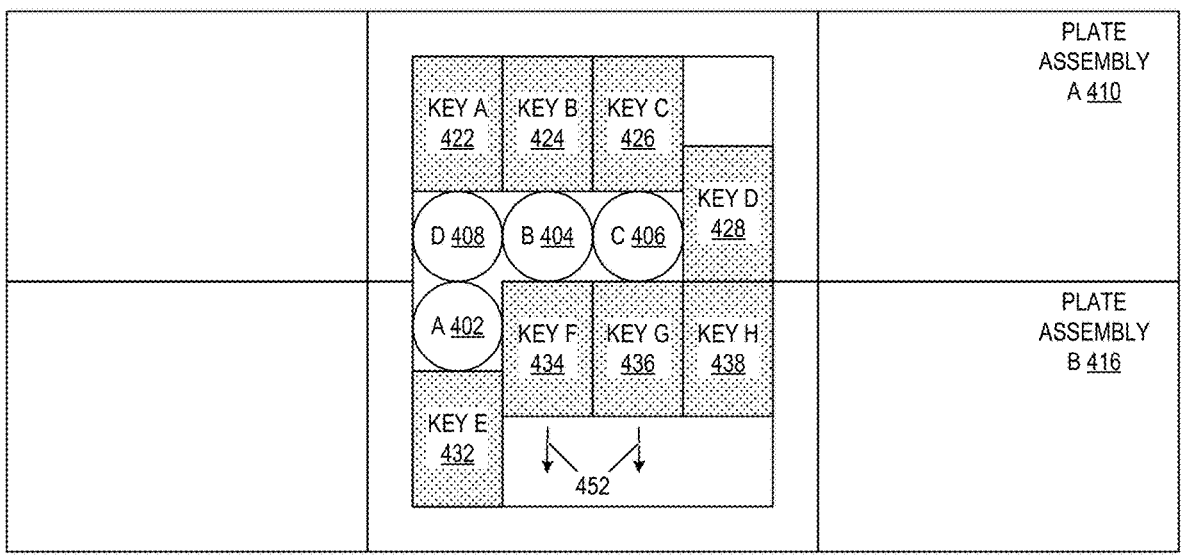
Figure 4H:
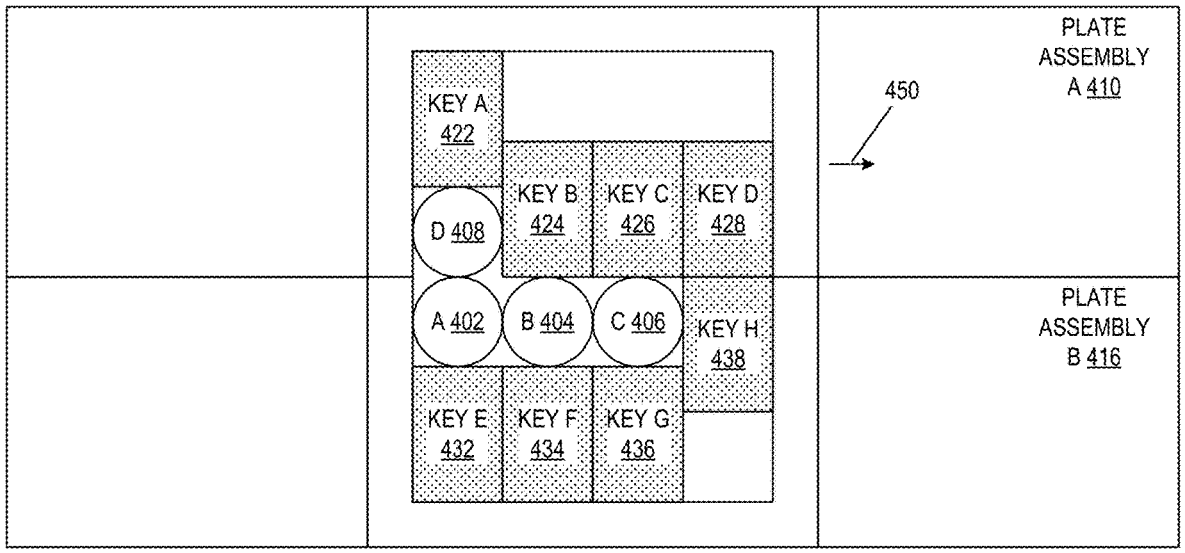
Figure 4I:
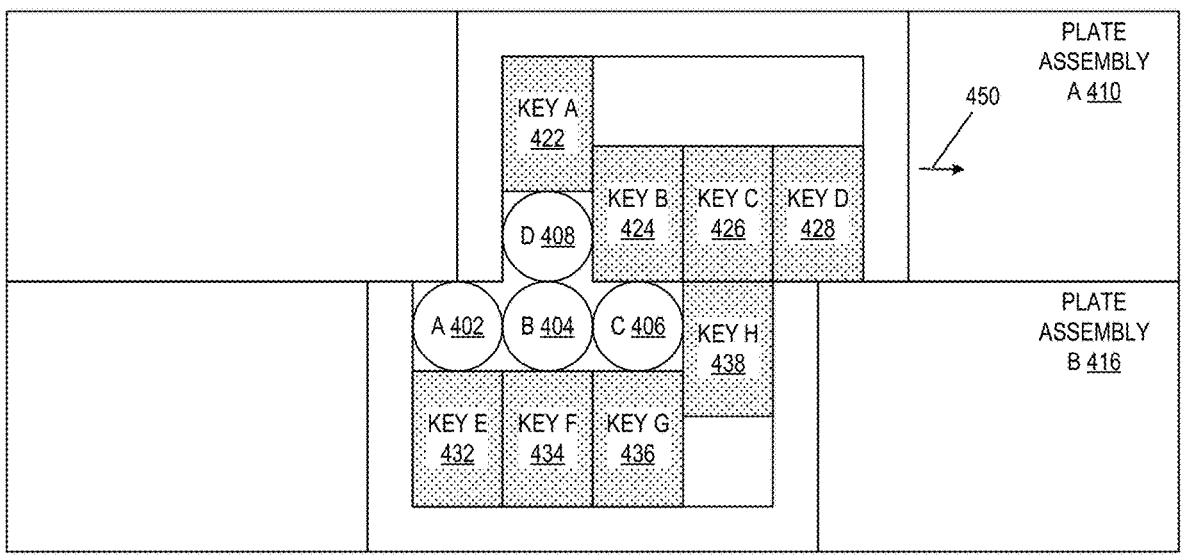
Figure 4J:
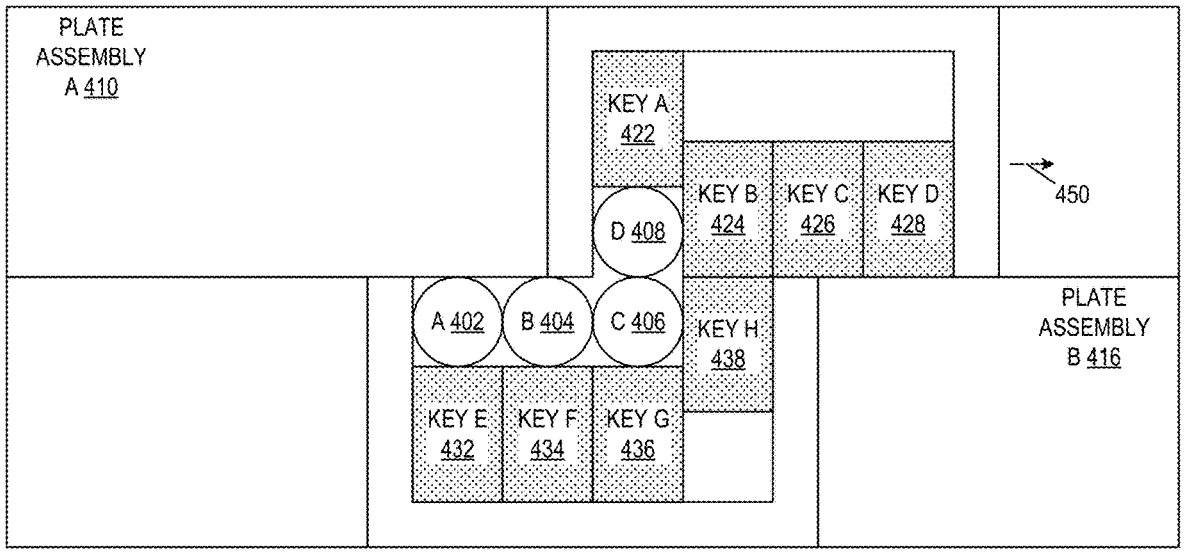
Figure 4K:
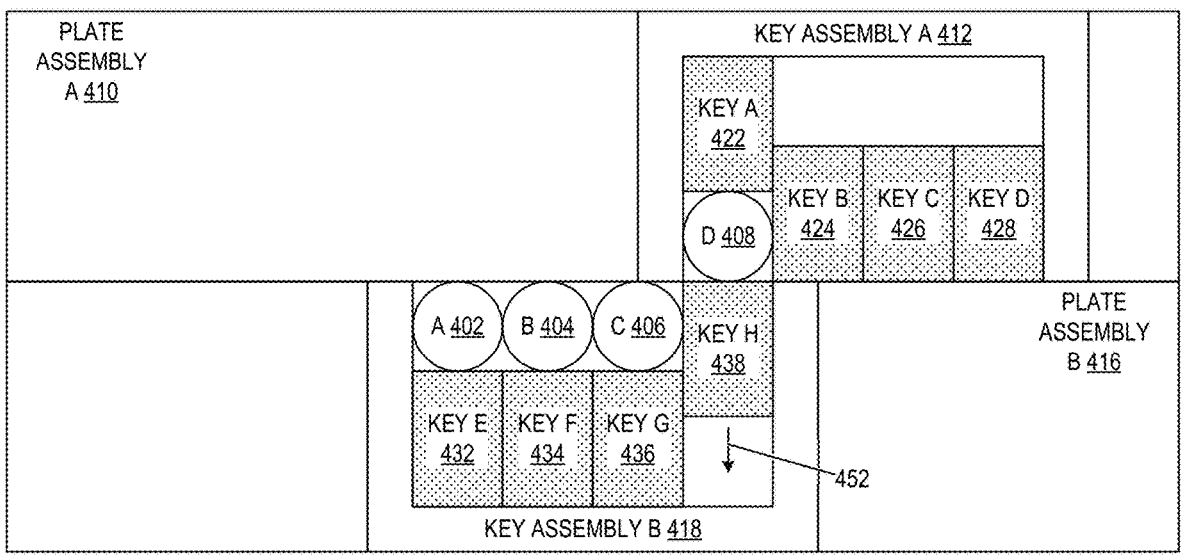
Figure 4L:
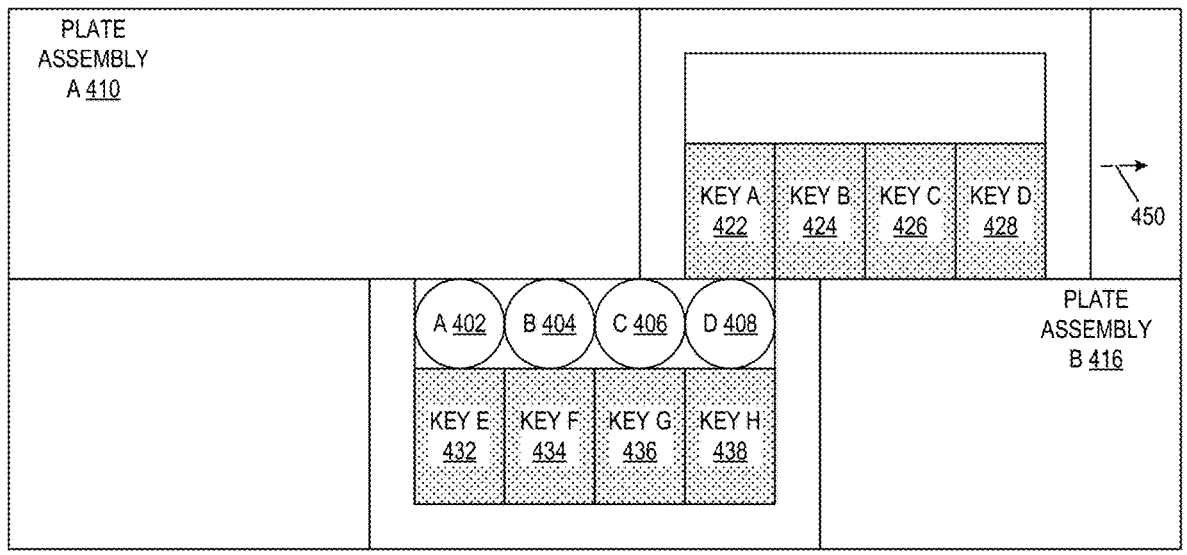
Figure 4M:
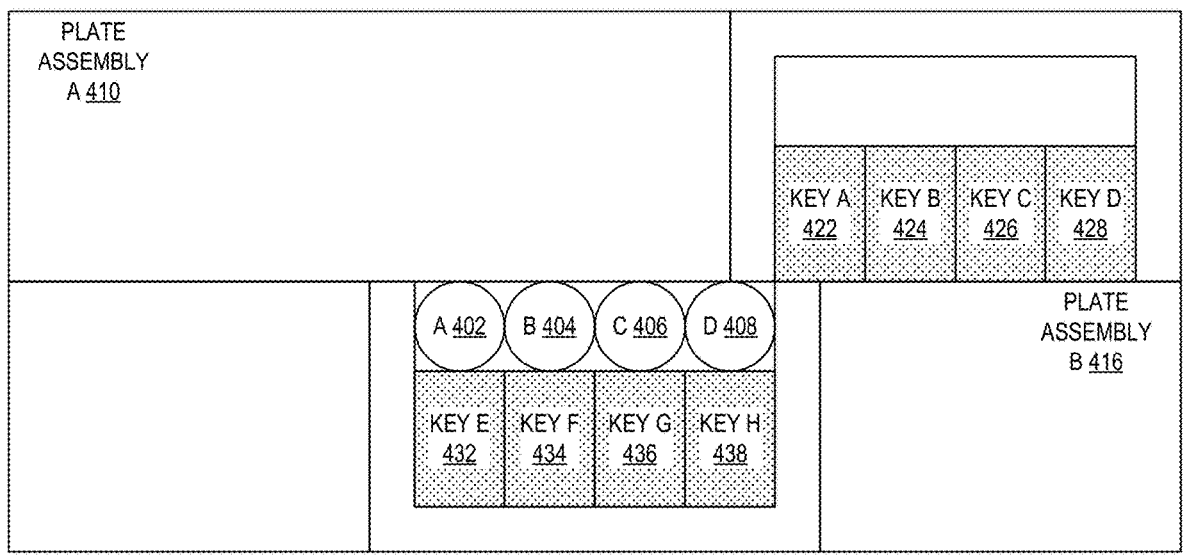
Figure 4N:
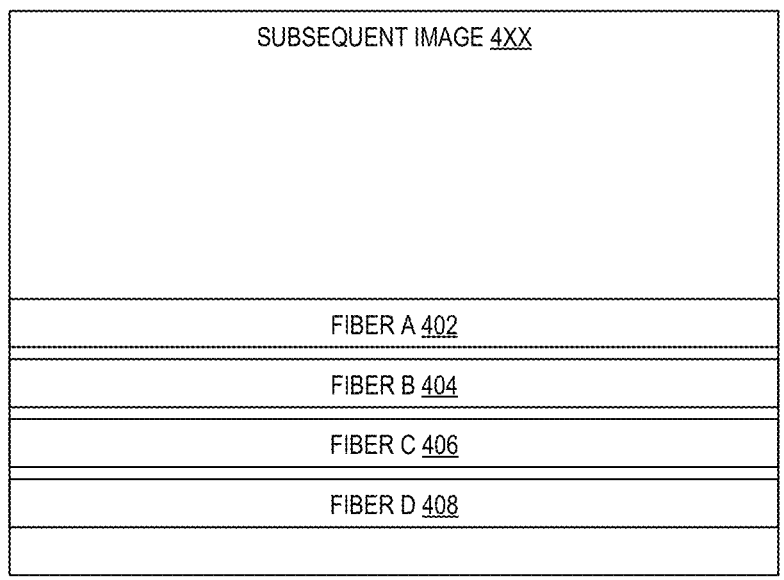

FIGS. 4A and 4N show the initial and subsequent images (400) and (480) with the initial and subsequent sequences of the fibers A (402), B (404), C (406), and D (408). FIGS. 4B through 4M show the movement of the fibers A (402) through D (408) between the first and second assemblies A 4XX and B 4XX.

Turning to FIG. 4A, the initial image (400) shows the initial sequence of the fibers A (402) through D (408). The initial sequence is "D, B, C, A", which is to be reorganized to the predetermined sequence of "A, B, C, D". The table below shows the initial sequence of the fibers A (402) through D (408), the predetermined sequence to which the fibers A (402) through D (408) are to be organized, the upper keys that correspond to the predetermined sequence, the lower keys that correspond to the predetermined sequence, and the key combinations that combine the upper and lower keys for the predetermined sequence.

| Initial Sequence | Predetermined Sequence | Upper Key | Lower Key | Key Combination |
| --- | --- | --- | --- | --- |
| D | A | D 428 | E 432 | D (428), E 432 |
| B | B | B 424 | F 434 | B (424), F 434 |
| C | C | C 426 | G 436 | C (426), G 436 |
| A | D | A 422 | H 438 | A (422) H 438 |

Turning to FIG. 4B, the plate assembly A (410) includes the key assembly A (412). The key assembly A (412) includes the keys A (422), B (424), C (426), and D (428). The plate assembly B (416) includes the key assembly B (418). The key assembly B (418) includes the keys E (432), F (434), G (436), and H (438). The plate assembly A (410) (and all of its components) slide in the direction (450) with respect to the plate assembly B (416).

Turning to FIG. 4C, the fiber A (402) is juxtaposed between the aligned combination of keys D (428) and E (432). Responsive to the alignment of the key combination, the keys D (428) and E (432) are actuated to move the fiber A (402) in the direction (452) from the plate assembly A (410) (and the key assembly A (412)) to the plate assembly B (416) (and the key assembly B (418)).

Turning to FIG. 4D, the fiber A (402) has been transferred to the plate assembly B (416). The plate assembly A (410) continues to move in the direction (450) with respect to the plate assembly B (416).

Turning to FIG. 4E, none of the keys A (422) through C (426) are aligned with the keys F (434) through H (438). The plate assembly A (410) continues to move in the direction (450) with respect to the plate assembly B (416).

Turning to FIG. 4F, the key C (426) is aligned with the key F (434) but is not one of the key combinations for generating the predetermined sequence. The plate assembly A (410) continues to move in the direction (450) with respect to the plate assembly B (416).

Turning to FIG. 4G, the keys B (424) and C (426) are respectively aligned with the keys F (434) and G (436). These two key combinations are actuated to transfer the fibers B (404) and C (406) in the direction (452) from the plate assembly A (410) to the plate assembly B (416).

Turning to FIG. 4H, the fibers B (404) and C (406) have as been transferred to the plate assembly B (416). The plate assembly A (410) continues to move in the direction (450) with respect to the plate assembly B (416).

Turning to FIGS. 4I and 4J, the key A (422) is not aligned with the key H (438). The plate assembly A (410) continues to move in the direction (450) with respect to the plate assembly B (416).

Turning to FIG. 4K, the key A (422) is aligned with the key H (438). Responsive to the alignment of the key combination, the keys A (422) and H (438) are actuated to move the fiber D (408) in the direction (452) from the plate assembly A (410) (and the key assembly (412)) to the plate assembly B (416) (and the key assembly B (418)).

Turning to FIG. 4L, the fiber D (408) has been transferred to the plate assembly B (416). The plate assembly A (410) continues to move in the direction (450) with respect to the plate assembly B (416).

Turning to FIG. 4M, the fibers A (402) through D (408) are in a subsequent sequence that matches the predetermined sequence. Movement of the plate assembly A (410) with respect to the plate assembly B (416) is complete.

Turning to FIG. 4N, the subsequent image (480) captures the positions and sequence of the fibers A (402) through D (408). The sequence of the fibers A (402) through D (408) matches with the predetermined sequence "A, B, C, D".

Figure 5A:
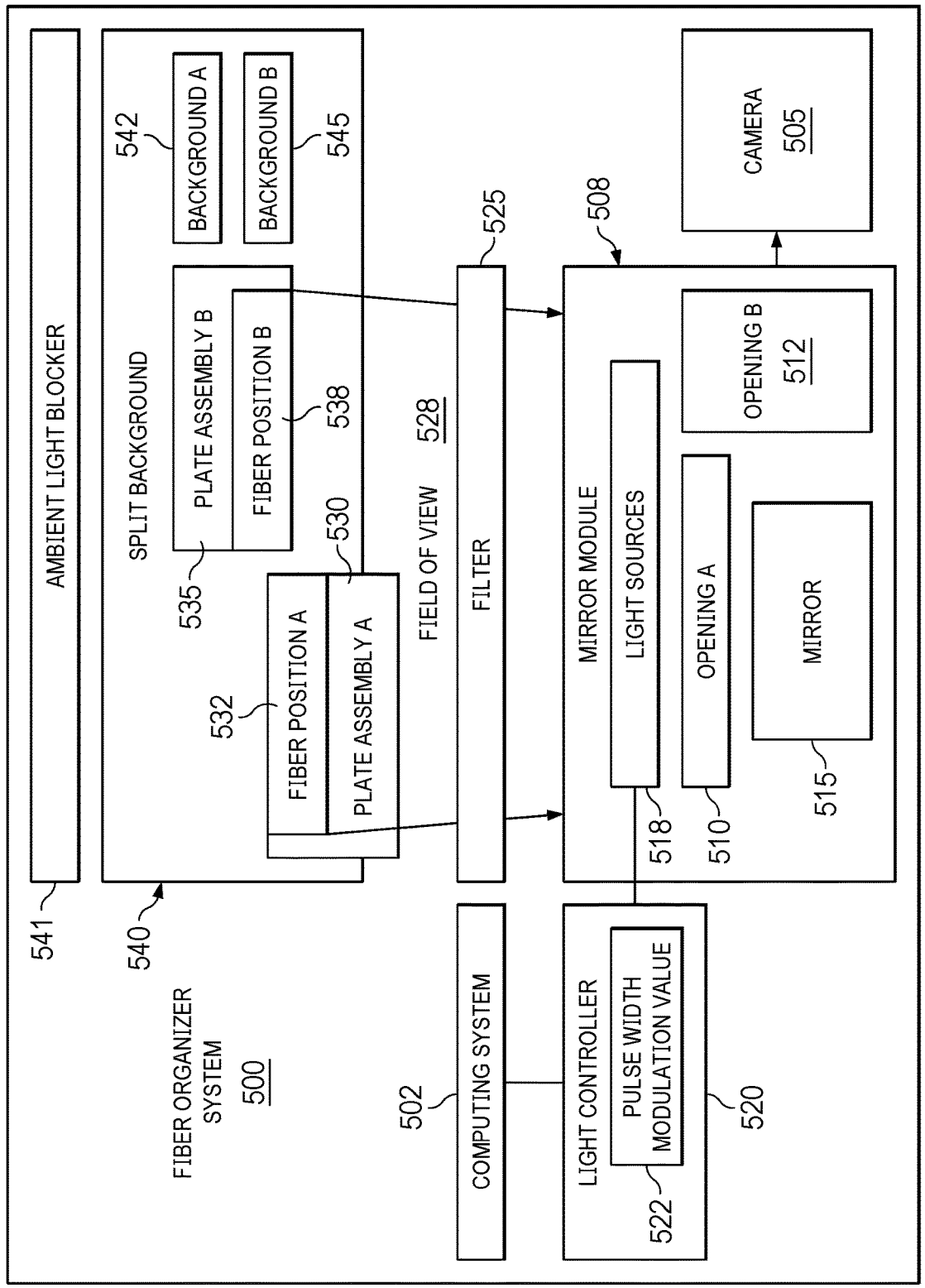
FIG. 5A and FIG. 5B show diagrams of systems in accordance with disclosed embodiments.

Turning to FIG. 5A, the fiber organizer system (500) organizes fibers. The fiber organizer system (500) may include the features and elements of the fiber organizer system (100) of FIG. 1A, and vice versa. The fibers are organized from a random order (at the fiber position A (532)) to a specified order (at the fiber position B (538)) and checks the order of the fibers (before and after) using the camera (505). The fiber organizer system (500) may be controlled by the computing system (502).

The camera (505) images fibers in the fiber positions A (532) and B (538). The camera (505) has the field of view (528), which is wide enough to image fibers in the fiber positions A (532) and B (538). Light from the fibers passes through the mirror module (508).

The mirror module (508) supports the light sources (518) and the mirror (515) and includes the openings A (510) and B (512). The mirror module (508) light from the light sources (518) reflects off fibers in the fiber positions A (532) and B (538) through the opening A (510), reflects off the mirror (515), and passes through the opening B (512) to the camera (505).

In one embodiment, the light sources (518) are light emitting diodes (LEDs) and are arranged around the opening A (510). Arrangement of the light sources (518) around the opening A (510) is referred to as stadium lighting.

The light controller (520) controls the lights sources (518). The light controller (520) is connected to the computing system (502) from which a pulse width modulation value (522) may be received. The pulse width modulation value (522) is used to control the duty cycle of the light sources (518) from 0% to (100)%.

The filter (525) filters the light used to image the fibers in the fiber positions A (532) and B (538). The filter (525) may be a diffusion filter to soften the light.

The split background (540) includes the backgrounds A (542) and B (545), which have different colors. For example, the background A (542) may be white and the background B (545) may be black to prevent fibers from "disappearing" into the background when the color of a fiber is about the same as the background color. The split background is arranged around the fiber positions A (532) and B (538).

The fiber positions A (532) and B (538) are the positions of the fibers for the initial position (prior to being organized) and the sorted position (after being organized). The fiber positions A (532) and B (538) are respectively in the plate assemblies A (530) and B (535).

The plate assemblies A (530) and B (535) receive and sort the fibers. The plate assemblies A (530) receives the unsorted fibers, which are moved to the plate assembly B (535) as plate assembly B (535) slides across the plate assembly A (530).

The ambient light blocker (541) block ambient light. The ambient light blocker (541) is positioned around the fiber positions A (532) and B (538) to prevent ambient light from reflecting off fibers in the fiber positions A (532) and B (538). The split background (540) may be integrated into the ambient light blocker.

Figure 5B:
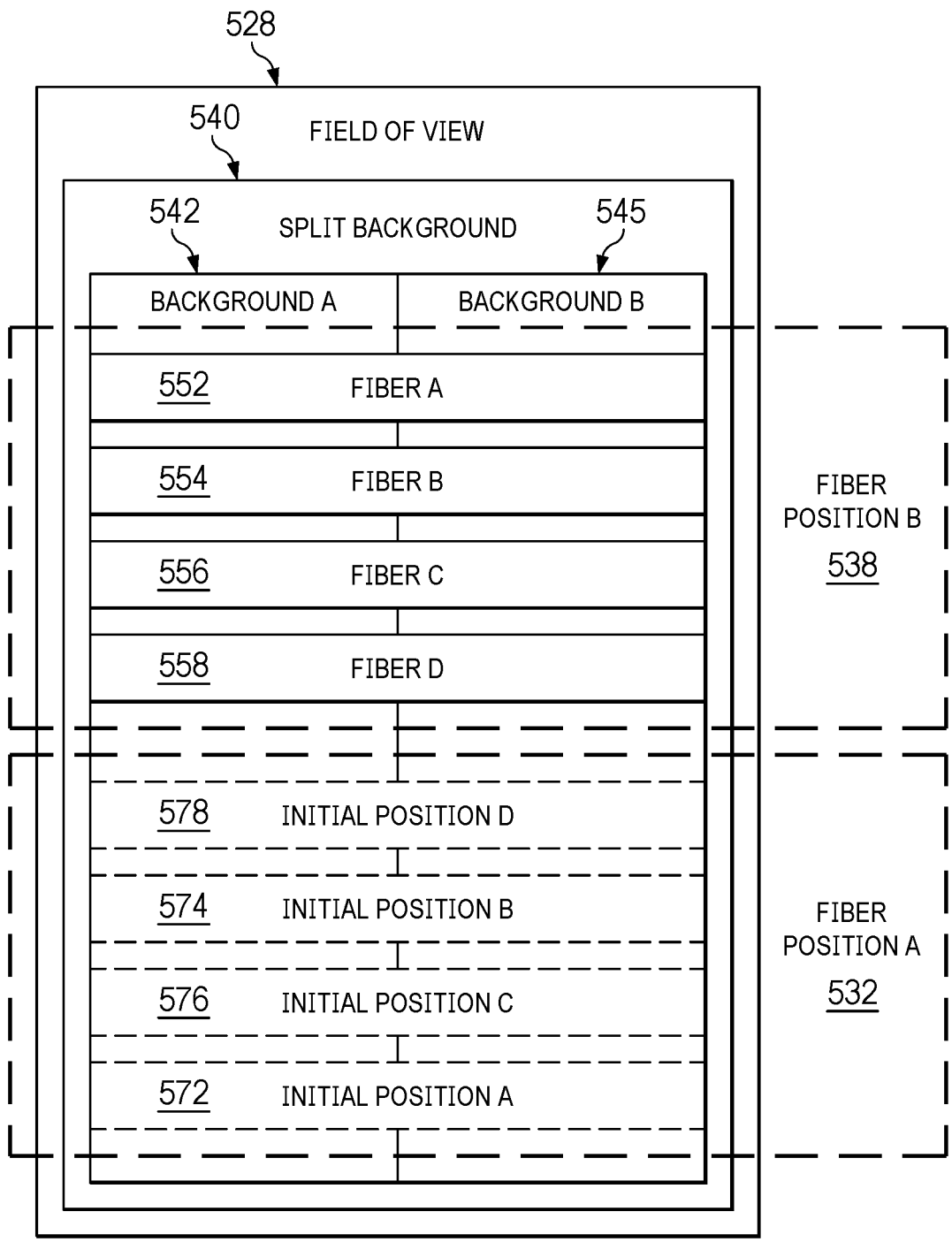

Turning to FIG. 5B, the fibers A (552), B (554), C (556), and D (558) start in the initial positions A (572), B (574), C (576), and D (578) of the fiber position A (532). After being organized. The fibers A (552) through D (558) are in the fiber position B (538) in a predetermined order.

The lengths of the fibers A (552) through D (558) extend across both of the backgrounds A (542) and B (545) of the split background (540) in the field of view (528). By extending across both of the backgrounds A (542) and B (545), the fibers A (552) through D (558) may be imaged in front of a background color that is different from the color of the fibers A (552) through D (558). For example, when the fiber A (552) is black and the background A (542) is black (which may prevent the fiber A (552) from being distinguishable form the background A (542)), the fiber A (552) is also in front of the background B (545), which is a different color.

Figure 6:
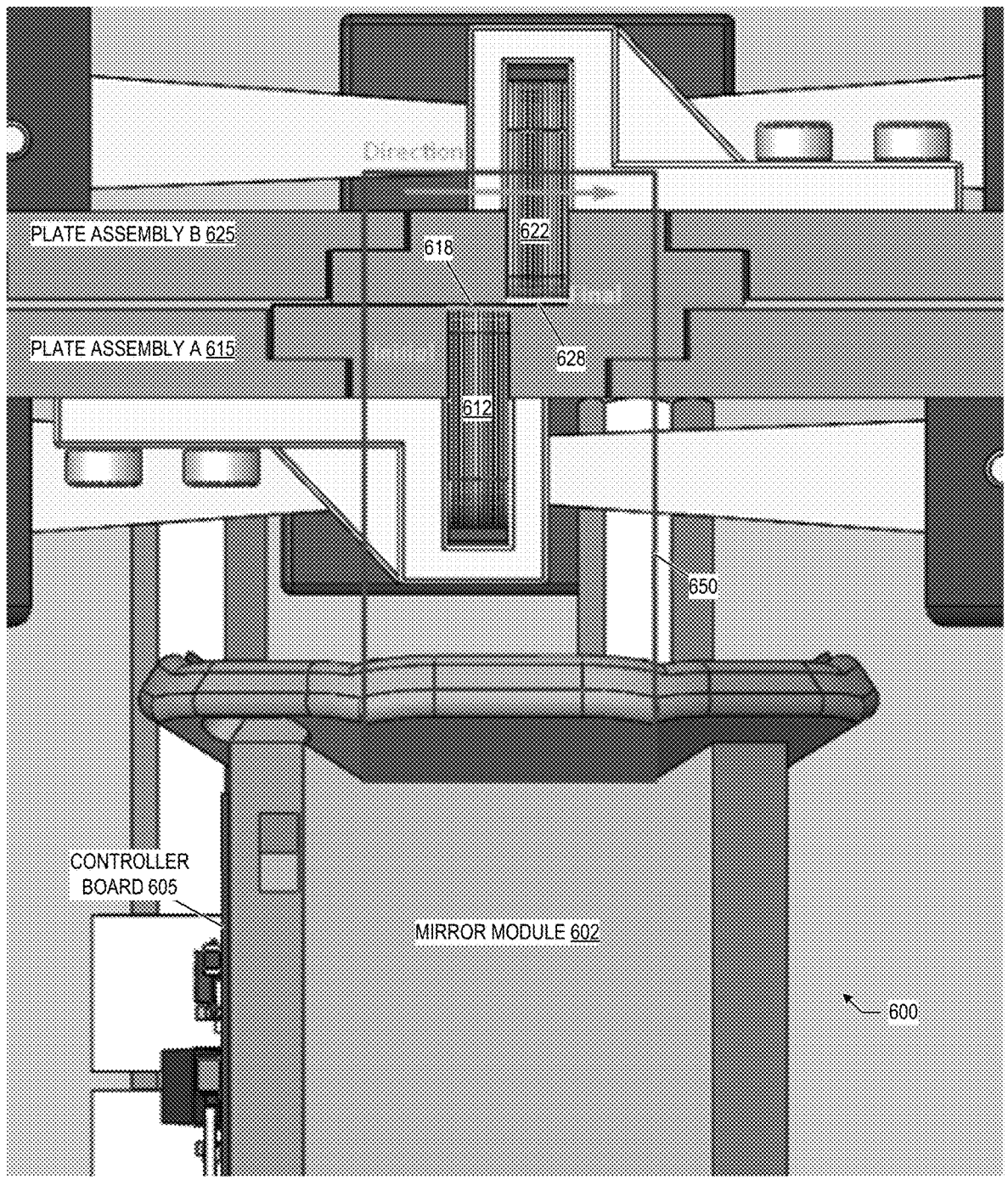
FIG. 6, FIG. 7, FIG. 8A, FIG. 8B, FIG. 9A, and FIG. 9B show examples in accordance with disclosed embodiments.

Turning to FIG. 6, the fiber organizer (600) organizes fibers using the mirror module (602). The mirror module (602) reflects light from the fiber positions A (618) and B (628) to a camera with the field of view (650). The controller board (605) controls the light sources that shine onto the fiber positions A (618) and B (628) using a pulse width modulation value.

The plate assembly A (615) includes the keys (612) that receive fibers into the fiber position A (618). The plate assembly B (625) includes the keys (622) that receive fibers into the fiber position B (628) after sliding across the plate assembly A (615).

Figure 7:
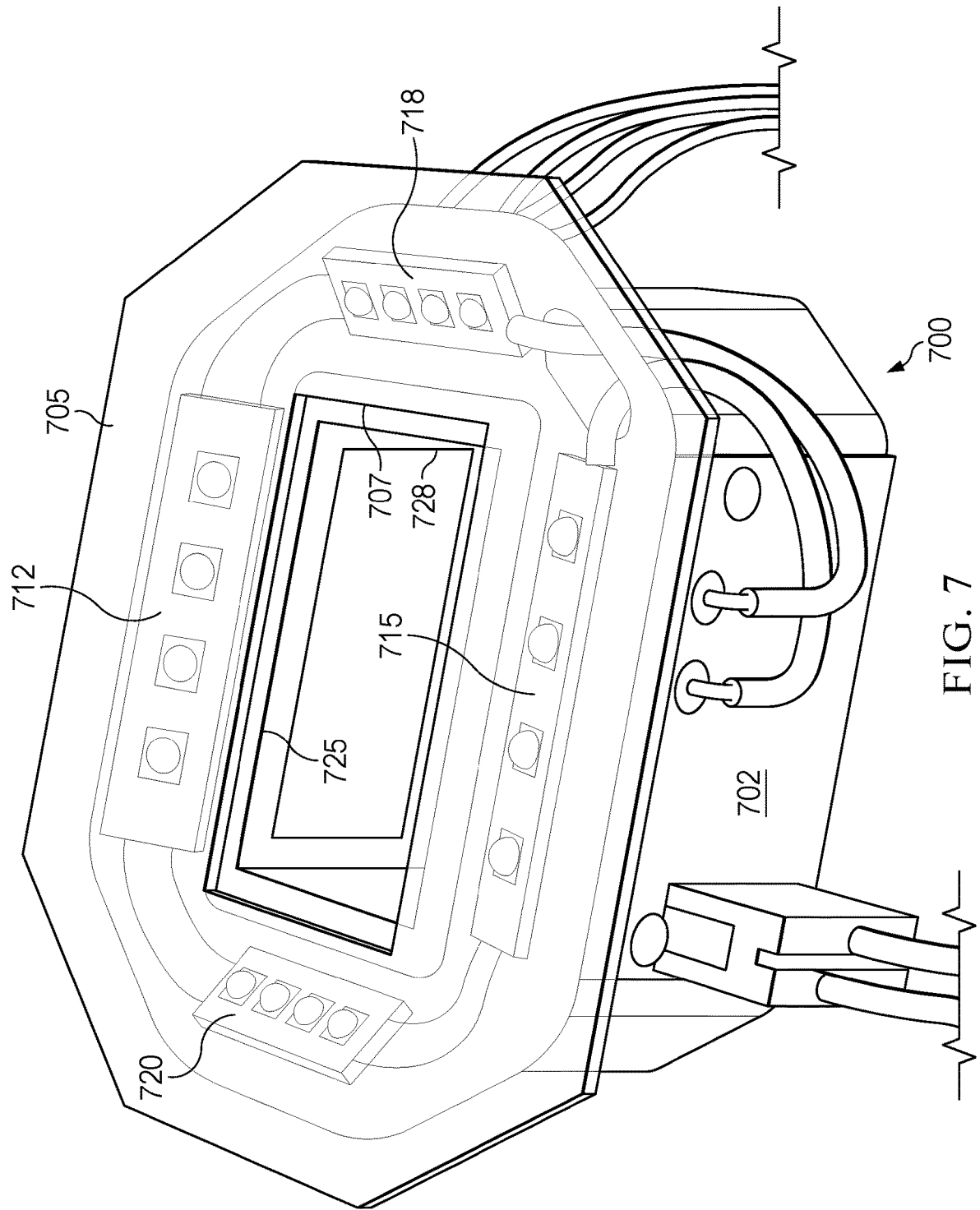

Turning to FIG. 7 the mirror module is connected to the controller board (702). The controller board (702) controls the light sources of the mirror module (700), which include the LEDs in the LED banks (712), (715), (718), and (720).

The LED banks (712), (715), (718), and (720) each include a set of LEDs (e.g., 4) that are controlled by the controller board (702). The LED banks (712), (715), (718), and (720) surround the opening (725) of the mirror module (700) to provide stadium lighting and reduce the number of shadows created by fibers off of which the light from the LED banks (712) through (720) reflect.

The mirror module includes the opening (728) and the opening (725). The opening (728) allows light to pass between the mirror module and a camera. The opening (725) allows light to pass between the mirror module (700) and a group of fibers.

The filter (705) is placed between the mirror module (700) and the location of the fibers. The filter (705) filters the light form the LEDs of the LED banks (712) through (720). The filtered light reflects off a set of fibers and returns through the opening (707). The opening (707) to allow light reflected from a fiber to pass through to a camera without being filtered.

Figure 8A:
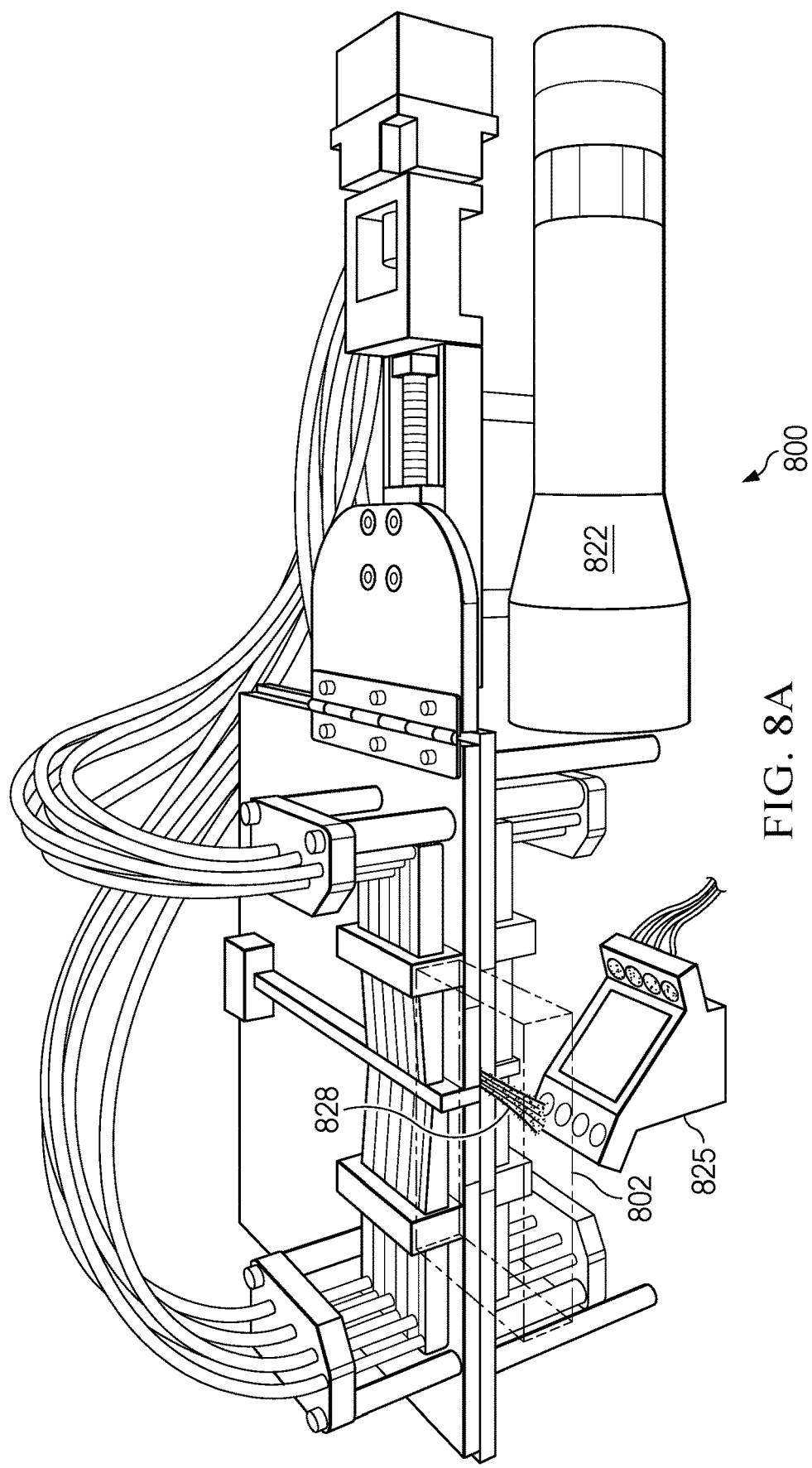

Turning to FIG. 8A, the position (802) of an ambient light blocker is illustrated. The fiber organizer (800) includes the camera (822) that images the fibers (828) using the mirror module (825).

Figure 8B:
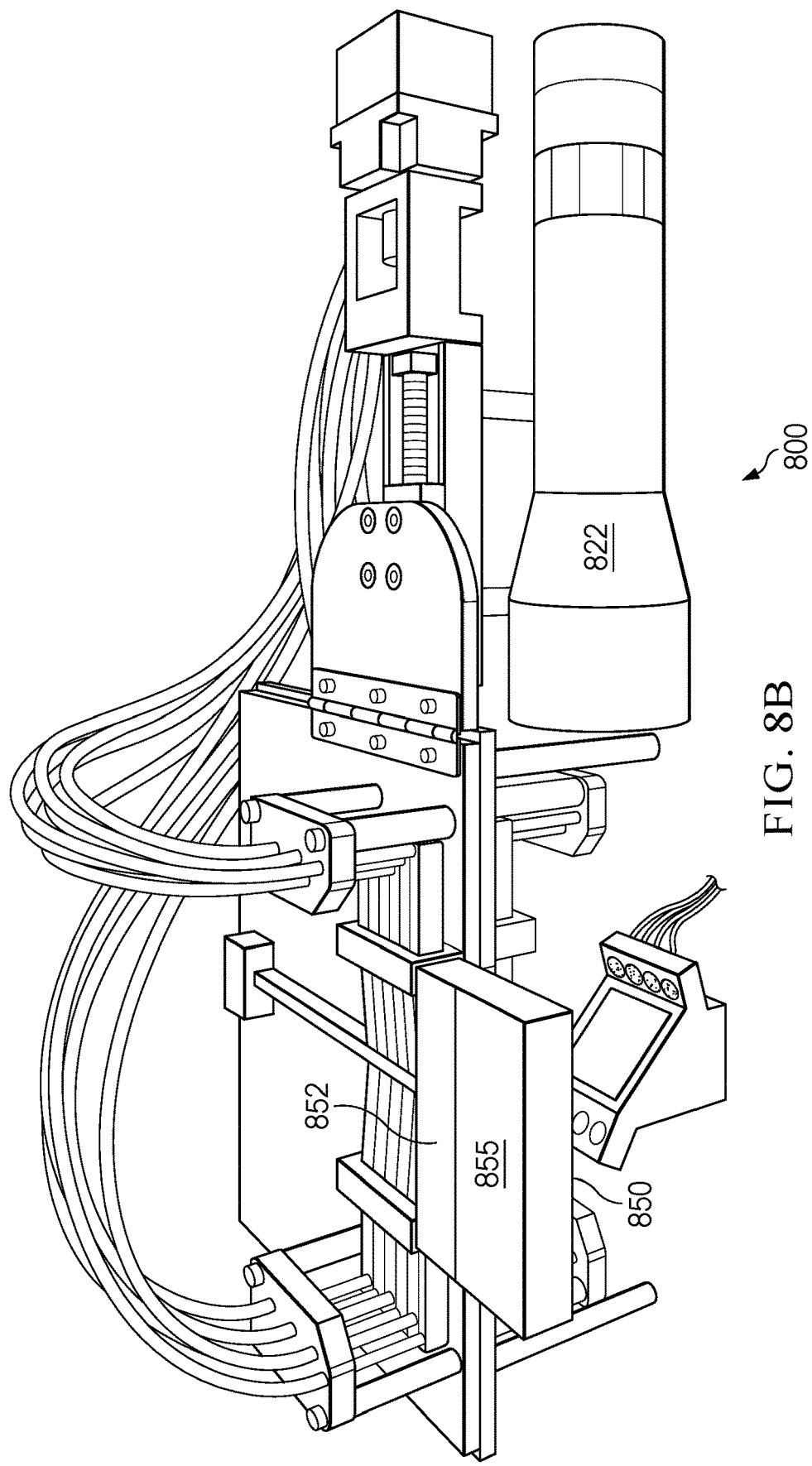

Turning to FIG. 8B, the ambient light blocker (850) covers the fibers (828) (of FIG. 8A) and blocks ambient light to increase the accuracy of detecting the location of the fibers (828) in the images generated with the camera (822).

The ambient light blocker (850) includes a split background with the backgrounds (852) and (855). The backgrounds (852) and (855) are different colors with the background (852) being white and the background (855) being black.

Figure 9A:
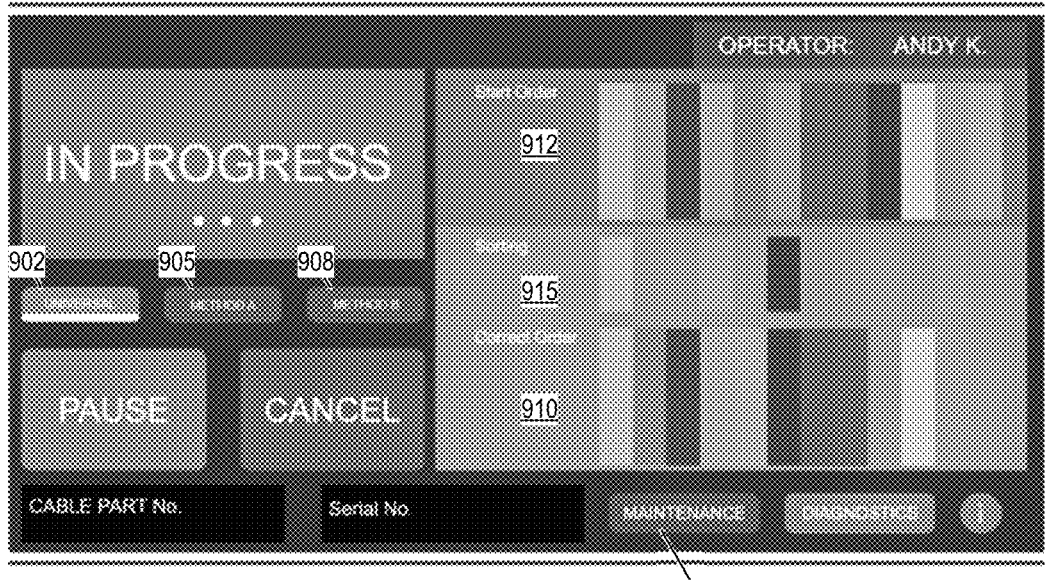

Turning to FIG. 9A, the user interface (900) is displayed by a program to control a fiber organizer. The user interface (900) includes several user interface widgets that operate and provide the status of the fiber organizer.

Selection of one of the buttons (902), (905), and (908) identifies the polarity to use to organize the fibers. Selecting the different polarity changes the order of the fibers in the window (910).

The window (912) shows the "start order" or initial order of the fibers. The initial order is determined by the system by taking an image of the fibers and user a machine learning system to recognize the colors of the fibers in the image from which the order of the fibers is determined.

The window (915) shows the fibers as the fibers are being sorted by the fiber organizer. For example, when a pair of keys are actuated move a fiber from an initial position in the random set of fibers to a subsequent position in an ordered set of fibers, the window (915) is updated to show the color of the fiber that was moved. After all of the fibers have been moved (e.g., by sliding a plate assembly over another plate assembly) from initial positions to subsequent positions (which may be take about six seconds), the colors of the fibers in the window (915) should match with the colors of the fibers in the window (910). The camera system takes another image and the subsequent positions of the fibers are verified from the image using a machine learning model.

The user interface (900) includes the button (922). Selection of the button (922) transitions from the user interface (900) to the user interface (950) of FIG. 9B.

Figure 9B:
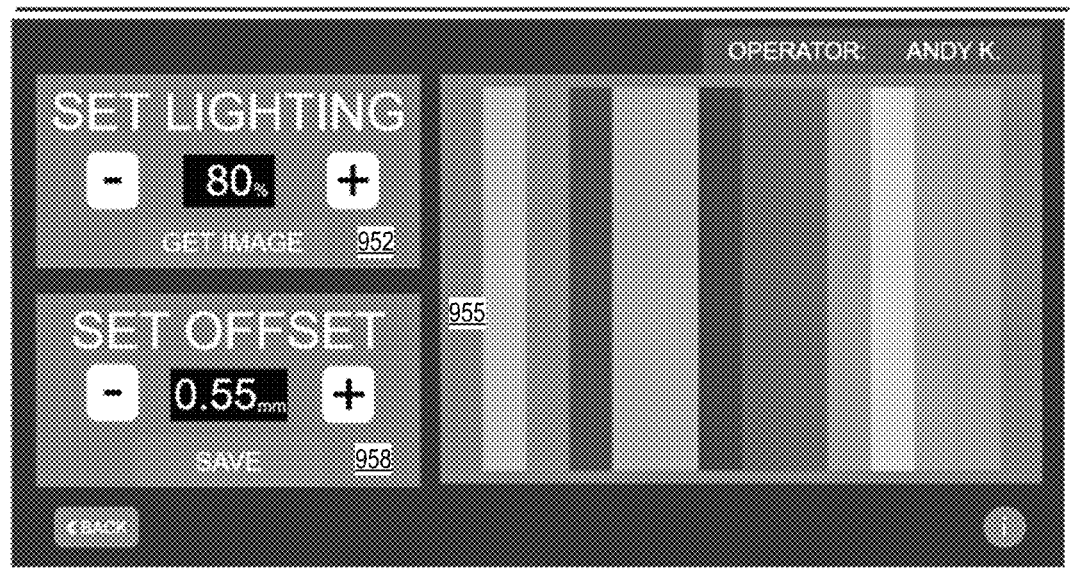

Turning to FIG. 9B, the user interface (950) is displayed by a computing device. The user interface (950) provides access to a maintenance mode, which includes the windows (952), (955), and (958).

The window (952) includes user interface elements to set a pulse width modulation value. The pulse width modulation value is the percentage (displayed as "70%" in the window (952)) that defines the duty of the light sources illuminating the fibers for imaging by the camera. Selecting the button labeled "get image" triggers the system to capture an image of the fibers, use the machine learning model to recognize the order of fibers, and display the order of fibers in the window (955).

The window (958) sets an offset between the first and second plate assemblies of the fiber organizer system. The offset (identified as "0.55 mm") may be from the range of −1 to +1 millimeters. The offset may be adjusted to ensure proper movement of the fibers between the keys of the fiber organizer.

Figure 10A:
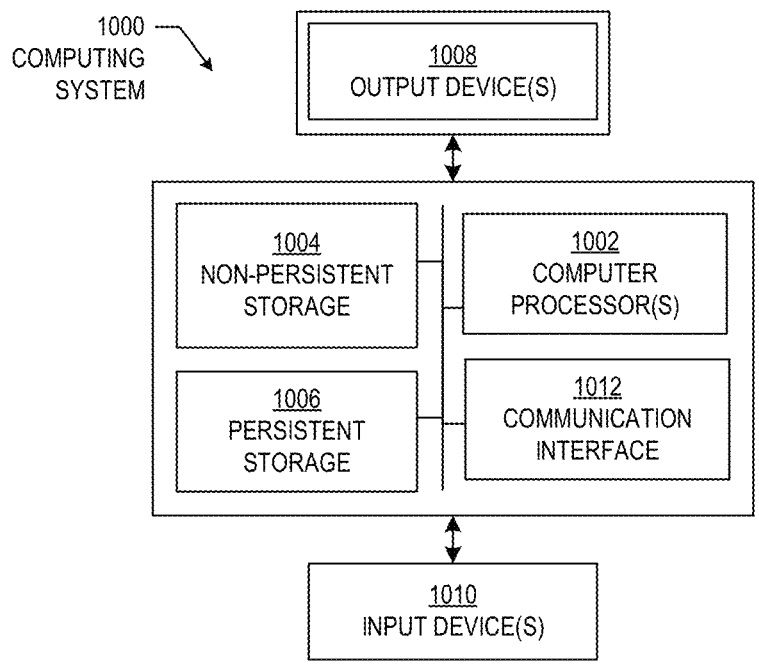
FIG. 10A and FIG. 10B show computing systems in accordance with disclosed embodiments.

Embodiments of the invention may be implemented on a computing system. Any combination of a mobile, a desktop, a server, a router, a switch, an embedded device, or other types of hardware may be used. For example, as shown in FIG. 10A, the computing system (1000) may include one or more computer processor(s) (1002), non-persistent storage (1004) (e.g., volatile memory, such as a random access memory (RAM), cache memory), persistent storage (1006) (e.g., a hard disk, an optical drive such as a compact disk (CD) drive or a digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) (1002) may be one or more cores or micro-cores of a processor. The computing system (1000) may also include one or more input device(s) (1010), such as a touchscreen, a keyboard, a mouse, a microphone, a touchpad, an electronic pen, or any other type of input device.

The communication interface (1012) may include an integrated circuit for connecting the computing system (1000) to a network (not shown) (e.g., a local area network (LAN), a wide area network (WAN) such as the Internet, a mobile network, or any other type of network) and/or to another device, such as another computing device.

Further, the computing system (1000) may include one or more output device(s) (1008), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1008) may be the same or different from the input device(s) (1010). The input and output device(s) (1010 and (1008)) may be locally or remotely connected to the computer processor(s) (1002), non-persistent storage (1004), and persistent storage (1006). Many different types of computing systems exist, and the aforementioned input and output device(s) (1010 and (1008)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 10B:
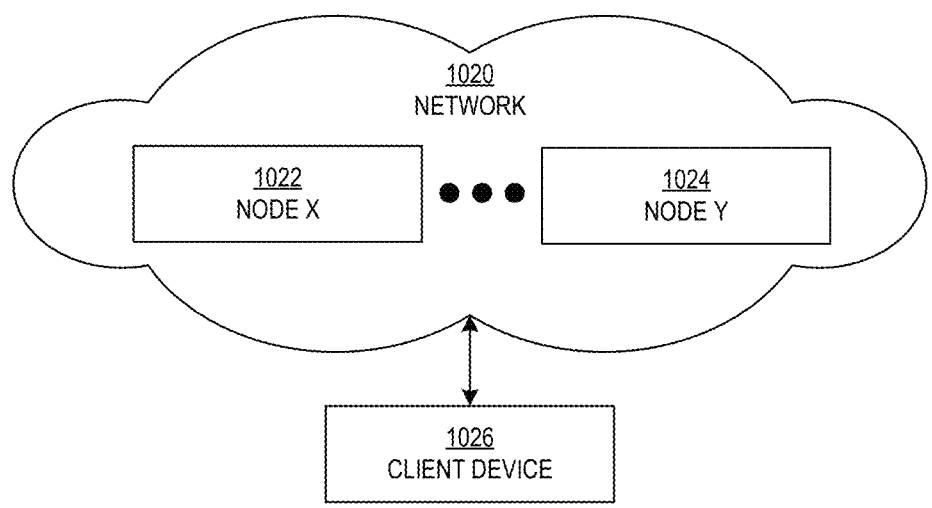

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system (1000) shown in FIG. 10A, or a group of nodes combined may correspond to the computing system (1000) shown in FIG. 10A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system (1000) shown in FIG. 10A. Further, the client device (1026), as shown in FIG. 10B, may include and/or perform all or a portion of one or more embodiments of the invention.

The computing system (1000) or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (1000) in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (1000) of FIG. 10A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1000) in FIG. 10A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1000) of FIG. 10A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1000) of FIG. 10A and the nodes (e.g., node X (1022), node Y (1024)) and/or client device (1026) in FIG. 10B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method comprising:
receiving a plurality of fibers into a first assembly of a plurality of first keys in juxtaposition;
imaging the plurality of fibers in front of a split background comprising at least two backgrounds and at least two colors;
obtaining an initial sequence of the plurality of fibers in the first assembly;
identifying a set of key combinations from the initial sequence and a predetermined sequence;
sliding a second assembly of a plurality of second keys in juxtaposition across the first assembly; and
actuating the set of key combinations to move the plurality of fibers from the first assembly to the second assembly and order the plurality of fibers in the second assembly in the predetermined sequence.

2. The method of claim 1, further comprising:
identifying a key combination from the set of key combinations comprising a first key from the first assembly and a second key from the second assembly.

3. The method of claim 1, further comprising:
actuating a key combination to move a fiber of the plurality of fibers from the first assembly to the second assembly and place the fiber into the second assembly in accordance with the predetermined sequence.

4. The method of claim 1, further comprising:
actuating, based on a position of the first assembly with respect to the second assembly, a first key from the first assembly and a second key from the second assembly to move a fiber of the plurality of fibers from the first assembly to the second assembly.

5. The method of claim 1, further comprising:
imaging the plurality of fibers extending from the first assembly, before sliding the second assembly, to generate an initial image; and
identifying the set of key combinations using the initial image.

6. The method of claim 1, further comprising:
imaging the plurality of fibers extending from the second assembly, after sliding the second assembly, to generate a subsequent image;
determining a subsequent sequence of the plurality of fibers from the subsequent image; and
verifying the subsequent sequence with the predetermined sequence using the subsequent image.

7. The method of claim 1, further comprising:
training a machine learning model to generate a prediction of a training order of training fibers in response to a training carriage speed, a training key speed, a training fiber order, and a training cycle time.

8. The method of claim 1, further comprising:
selecting a carriage speed for the sliding and a key speed for the actuating using a machine learning model, the initial sequence, and a number of machine cycles.

9. The method of claim 1, wherein a key width of a first key of the first set of keys and of a second key of the second set of keys is about equal to a fiber diameter of a fiber of the plurality of fibers.

10. The method of claim 1, further comprising:
limiting movement of a key of the first assembly with an insert to a plate of the first assembly.

11. The method of claim 1, further comprising:
imaging the plurality of fibers in front of a split background.

12. The method of claim 1, further comprising:
imaging the plurality of fibers using a mirror module comprising:
a first opening;
a second opening surrounded with a plurality of light sources; and
a mirror disposed between the first opening and the second opening.

13. The method of claim 1, further comprising:
adjusting a pulse width modulation value of a plurality of light sources using one or more of an ambient lighting value and a movement speed; and
imaging the plurality of fibers using the pulse width modulation value.

14. The method of claim 1, further comprising:
imaging the plurality of fibers using a diffusion filter along a path between a camera and the plurality of fibers.

15. A fiber sorting system comprising:
a first assembly comprising a plurality of first keys in juxtaposition;
a second assembly comprising a plurality of second keys in juxtaposition;
a split background comprising at least two backgrounds and at least two colors;
a computing system; and
a control application;
the control application when executed on the computing system to perform:
obtaining an initial sequence of a plurality of fibers in the first assembly;
imaging the plurality of fibers in front of the split background;
identifying a set of key combinations from the initial sequence and a predetermined sequence;
sliding the second assembly across the first assembly; and
actuating the set of key combinations to move the plurality of fibers from the first assembly to the second assembly and order the plurality of fibers in the second assembly in the predetermined sequence.

16. The system of claim 15, wherein the control application is further configured for:
identifying a key combination from the set of key combinations comprising a first key from the first assembly and a second key from the second assembly.

17. The system of claim 15, wherein the control application is further configured for:
actuating a key combination to move a fiber of the plurality of fibers from the first assembly to the second assembly and place the fiber into the second assembly in accordance with the predetermined sequence.

18. The system of claim 15, wherein the control application is further configured for:
actuating, based on a position of the first assembly with respect to the second assembly, a first key from the first assembly and a second key from the second assembly to move a fiber of the plurality of fibers from the first assembly to the second assembly.

19. The system of claim 15, wherein the control application is further configured for:
imaging the plurality of fibers extending from the first assembly, before sliding the second assembly, to generate an initial image; and
identifying the set of key combinations using the initial image.

20. A fiber sorting system comprising:
a first assembly comprising a plurality of first keys in juxtaposition;
an insert;
a plate of the first assembly comprising the insert;
a second assembly comprising a plurality of second keys in juxtaposition;
a computing system; and
a control application;
the control application when executed on the computing system to perform:
obtaining an initial sequence of a plurality of fibers in the first assembly;
imaging the plurality of fibers in front of a split background comprising at least two backgrounds and at least two colors;

identifying a set of key combinations from the initial sequence and a predetermined sequence;
sliding the second assembly across the first assembly;
actuating the set of key combinations to move the plurality of fibers from the first assembly to the second assembly and order the plurality of fibers in the second assembly in the predetermined sequence; and
limiting movement of a key of the first assembly with an insert to the plate of a first assembly.

* * * * *